US012738562B2

(12) United States Patent
Ke et al.

(10) Patent No.: US 12,738,562 B2
(45) Date of Patent: Sep. 15, 2026

(54) BATTERY, METHOD FOR MANUFACTURING SAME, AND ELECTRICAL DEVICE

(71) Applicant: CONTEMPORARY AMPEREX TECHNOLOGY (HONG KONG) LIMITED, Hong Kong (CN)

(72) Inventors: Jianhuang Ke, Ningde (CN); Xiaobo Chen, Ningde (CN); Yao Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 252 days.

(21) Appl. No.: 18/612,130

(22) Filed: Mar. 21, 2024

(65) Prior Publication Data

US 2024/0266634 A1 Aug. 8, 2024

Related U.S. Application Data

(63) Continuation of application No. PCT/CN2022/072026, filed on Jan. 14, 2022.

(51) Int. Cl.
*H01M 10/6555* (2014.01)
*H01M 10/613* (2014.01)
(Continued)

(52) U.S. Cl.
CPC ..... *H01M 10/6555* (2015.04); *H01M 10/613* (2015.04); *H01M 10/6568* (2015.04); *H01M 50/474* (2021.01); *H01M 50/489* (2021.01)

(58) Field of Classification Search
CPC ......... H01M 10/6555; H01M 10/6557; H01M 10/647; H01M 10/625; H01M 10/613;
(Continued)

(56) References Cited

U.S. PATENT DOCUMENTS

2011/0236734 A1* 9/2011 Ikeda ................ H01M 50/3425 137/511
2013/0280564 A1* 10/2013 Zheng ..................... B60L 58/24 429/62

(Continued)

FOREIGN PATENT DOCUMENTS

CN 106654417 A 5/2017
CN 208507758 U 2/2019

(Continued)

OTHER PUBLICATIONS

JP2022128335 machine translation (Year: 2022).*

(Continued)

*Primary Examiner* — Brian R Ohara
*Assistant Examiner* — Brent C Thomas
(74) *Attorney, Agent, or Firm* — XSENSUS LLP

(57) ABSTRACT

An embodiment of this application provides a battery, a method for manufacturing same, and an electrical device. The battery includes: a plurality of battery cells arranged along a first direction. Each of the battery cells includes two first side faces disposed opposite to each other in the first direction, two second side faces disposed opposite to each other in a second direction, a top face and a bottom face disposed opposite to each other in a third direction, and two electrode terminals. The first direction, the second direction, and the third direction are orthogonal to each other. The first side faces are larger than the second side faces in area. The battery further includes a cooling component. The cooling component contains a cooling medium to cool the battery cells, and includes a cooling unit and an integrated unit.

15 Claims, 31 Drawing Sheets

(51) Int. Cl.
*H01M 10/6568* (2014.01)
*H01M 50/474* (2021.01)
*H01M 50/489* (2021.01)

(58) Field of Classification Search
CPC ......... H01M 10/6567; H01M 10/6568; H01M 50/3425
See application file for complete search history.

(56) References Cited

U.S. PATENT DOCUMENTS

| | | | | |
|---|---|---|---|---|
| 2016/0372806 | A1 * | 12/2016 | Lee | H01M 10/617 |
| 2020/0243926 | A1 * | 7/2020 | Dawley | H01M 10/617 |
| 2021/0226290 | A1 | 7/2021 | Lee | |
| 2023/0087721 | A1 * | 3/2023 | Oyake | H01M 50/291 429/120 |
| 2023/0275290 | A1 * | 8/2023 | Nakamura | H01M 10/486 429/120 |

FOREIGN PATENT DOCUMENTS

| | | | | |
|---|---|---|---|---|
| CN | 110994067 | A | | 4/2020 |
| DE | 102017219552 | A1 | | 5/2019 |
| DE | 102019132835 | A1 | | 6/2021 |
| FR | 2986910 | A1 | | 8/2013 |
| JP | 2009-301969 | A | | 12/2009 |
| JP | 2013-012463 | A | | 1/2013 |
| JP | 2014-509436 | A | | 4/2014 |
| JP | 2015028884 | A | * | 2/2015 |
| JP | 5699900 | B2 | | 4/2015 |
| JP | 6043555 | B2 | | 12/2016 |
| JP | 2019-212468 | A | | 12/2019 |
| JP | 2022128335 | A | * | 9/2022 |
| WO | 2019/107563 | A1 | | 6/2019 |

OTHER PUBLICATIONS

JP2015028884 machine translation (Year: 2015).*

Decision to Grant a Patent issued Jul. 22, 2025 in Japanese Patent Application No. 2024-517470 with English translation thereof.

Office Action issued Mar. 31, 2025 in Japanese Patent Application No. 2024-517470 with English translation thereof.

International Search Report mailed on Oct. 9, 2022, received for International Patent Application No. PCT/CN2022/072026, filed on Jan. 14, 2022, 07 pages including English Translation.

Extended European Search Report issued Apr. 28, 2025 in European Patent Application No. 22919460.0.

Office Action issued Nov. 19, 2025 in Korean Patent Application No. 10-2024-7012951 with English translation thereof.

* cited by examiner

BATTERY, METHOD FOR MANUFACTURING SAME, AND ELECTRICAL DEVICE

CROSS-REFERENCE TO RELATED APPLICATION

The present application is a continuation of International Application No. PCT/CN2022/072026, filed Jan. 14, 2022, which is incorporated herein by reference in its entirety.

TECHNICAL FIELD

This application relates to the field of battery technology, and in particular, to a battery, a method for manufacturing the battery, and an electrical device.

BACKGROUND

With the advancement of science and technology and the rapid development of the new energy industry, the design related to thermal safety has attracted more attention. Especially for a battery, when the energy density of the battery is increased continuously as required by people, the safety design of the battery is posing a huge challenge.

In the prior art, a battery typically includes a battery unit formed by stacking a plurality of battery cells. When thermal runaway occurs in one or more battery cells of the battery, how to control the thermal runaway to avoid massive thermal spread in the battery is a focus of design. In the existing design, because the battery cells are stacked together in a close-fitting manner, when one or more of the battery cells suffer from thermal runaway, a close-fitting surface of the battery cell becomes a largest heat transfer surface. To prevent thermal spread from occurring between the battery cells, the battery is generally designed by adding a heat insulation pad between the close-fitting surfaces of the battery cells to prevent thermal spread. However, with the increase of the energy density of the battery cell, the temperature of the battery cell is increasing once the battery cell is thermally runaway. Accordingly, the requirements imposed on a heat insulation space between the battery cells and on heat insulation capabilities are increasing. This undoubtedly poses a huge impact and challenge to the design of the energy density of the battery. Therefore, it is urgent to find a novel heat insulation method.

SUMMARY

In view of the above problems, an objective of this application is to provide a battery, a method for manufacturing same, and an electrical device to not only properly dissipate heat out of the battery during normal use, but also rapidly prevent thermal spread when the battery is thermally runaway, so as to cool the battery rapidly.

According to a first aspect, an embodiment of this application provides a battery. The battery includes: a plurality of battery cells, where the plurality of battery cells are arranged along a first direction. Each of the battery cells includes two first side faces disposed opposite to each other in the first direction, two second side faces disposed opposite to each other in a second direction, a top face and a bottom face disposed opposite to each other in a third direction, and two electrode terminals. The first direction, the second direction, and the third direction are orthogonal to each other. The first side faces are larger than the second side faces in area. The battery further includes a cooling component. The cooling component contains a cooling medium to cool the battery cells, and includes a cooling unit and an integrated unit. The cooling unit is in a plate shape formed by a first cooling wall and a second cooling wall that are opposite to each other in the first direction, and is disposed between two adjacent battery cells. A channel available for flow of the cooling medium is formed between the first cooling wall and the second cooling wall. The first cooling wall and the second cooling wall each include a fragile portion. When the battery is abnormal, the fragile portion is able to rupture to release the cooling medium.

According to the technical solution in this embodiment of this application, during the use of the battery, the cooling unit between the battery cells can more quickly dissipate the heat out of the battery when the heat is generated by the battery in a normal use state, thereby rapidly reducing the temperature of the battery, improving the heat dissipation capability of the product, and improving the fast-charging performance. In addition, when the battery is abnormal such as thermally runaway, the cooling unit located between the battery cells and fully in contact with the battery cells can greatly retard the heat transfer on a close-fitting surface of the battery cell, thereby greatly alleviating the risk of thermal/heat spread between the battery cells. In addition, the fragile portions disposed on the two cooling walls of the cooling unit can be utilized. When the battery is abnormal such as thermally runaway, the fragile portions are caused to rupture to rapidly release the cooling medium that flows in the cooling unit. The cooling medium is rapidly spread throughout the surface of the battery cell to implement rapid cooling. Even if the battery is thermally runaway or even in an emergency of burning and explosion, the technical solution hereof can still cope with the emergency quickly to ensure safety, and achieve a trade-off between the heat dissipation performance, stability, and safety of the battery.

In some embodiments, the fragile portion includes a thin-walled portion. A wall thickness of the thin-walled portion is less than a wall thickness of the remaining part of the first cooling wall and the second cooling wall. In this way, when the battery is abnormal, the thin-walled portion can be melted or burst through more easily. Moreover, because the thin-walled portion can be formed just by thinning the wall of the first cooling wall and the second cooling wall, the fragile portions can be implemented just through simple operations without involving a complicated manufacturing process.

In some embodiments, the first cooling wall and the second cooling wall each include an inner wall face and an outer wall face. The thin-walled portion is formed by reducing the wall thickness by starting from the inner wall face of the first cooling wall and the inner wall face of the second cooling wall. Therefore, by reducing the wall thickness from the inner wall face, the levelness of the outer wall face is maintained, and the outer wall face is brought into close contact with the battery cell adjacent to the cooling wall. Therefore, when the battery cell is abnormal, because the entire surface of the outer wall face is in close contact with the battery cell, the heat generated by the battery can be quickly transferred to the thin-walled portion to rupture the thin-walled portion.

In some embodiments, a thickness of the first cooling wall is identical to a thickness of the second cooling wall, and is 0.2 mm to 1.5 mm. The thickness of the thin-walled portion is less than or equal to 0.2 mm. Under the premise of ensuring the normal operation of the cooling medium and the reliable normal use of the battery, the thickness of the thin-walled portion is made as thin as practicable. For example, in contrast to the thickness (0.2 mm to 1.5 mm) of the first cooling wall and the second cooling wall, the thickness of the thin-walled portion is reduced to less than or equal to 0.2 mm, thereby ensuring that the thin-walled portion can be more easily melted or burst through when the battery is abnormal.

In some embodiments, a through-hole is created in the first cooling wall and the second cooling wall separately. The cooling unit further includes a thin film covering at least the through-hole. The fragile portion is formed by the through-hole and the thin film. By creating a hole and applying a film on the first cooling wall and the second cooling wall, the fragile portion can be implemented just through simple operations without involving a complicated manufacturing process. In addition, by forming the fragile portion by covering the through-hole with a thin film, the thin film can be broken more easily than the thin-walled portion formed by thinning the wall. Therefore, the fragile portion can respond more quickly to changes in the battery temperature.

In some embodiments, the thickness of the first cooling wall is identical to the thickness of the second cooling wall, and is 0.2 mm to 1.5 mm. The thickness of the thin film is 0.1 to 0.3 mm. Under the premise of ensuring the normal operation of the cooling medium and the reliable normal use of the battery, the thickness of the thin film is made as thin as practicable. For example, in contrast to the thickness (0.2 mm to 1.5 mm) of the first cooling wall and the second cooling wall, the thickness of the thin film m is reduced to 0.1 mm to 0.3 mm, thereby ensuring that the thin film can be more easily melted or burst through when the battery is abnormal. In addition, in contrast to the process of thinning the first cooling wall and the second cooling wall, the process of creating a hole and applying a film on the first cooling wall and the second cooling wall enables selection of thin films m of different thicknesses for different types of batteries and different application environments based on the actual situation, and is more flexibly applicable.

In some embodiments, a linear wall-face flow channel recessed from an outer wall face is created on the outer wall face of the first cooling wall and the outer wall face of the second cooling wall. In a plan view viewed from the first direction, the wall-face flow channel partially overlaps the fragile portion. The disposed linear wall-face flow channel facilitates the flow of the cooling medium gushing out from the ruptured fragile portion when the battery is abnormal, and enables the released cooling medium to spread to the surface of the battery cell more quickly.

In some embodiments, in a plan view viewed from the first direction, the linear wall-face flow channel forms a grid pattern or a radial pattern centered on the fragile portion. The linear wall-face flow channel is designed in a grid pattern or a radial pattern centered on the fragile portion, thereby further facilitating the flow of the cooling medium gushing out from the ruptured fragile portion, and enabling the released cooling medium to spread to the surface of the battery cell more quickly.

In some embodiments, a wall-face recess recessed from an outer wall face is created on the outer wall face of the first cooling wall and the outer wall face of the second cooling wall. The wall-face recess provides an expansion space for the battery cell. In the second direction, a distance between an edge of the wall-face recess and an edge of a closest outer wall face is 3% to 20% of a length of the outer wall face in the second direction and is greater than 2 mm; in the third direction, a distance between the edge of the wall-face recess and the edge of the closest outer wall face is 3% to 20% of a length of the outer wall face in the third direction and is greater than 2 mm; or, an area of the wall-face recess accounts for 60% to 90% of the outer wall face, and a depth of the wall-face recess is 10% to 90% of the wall thickness. The fragile portion is disposed at the wall-face recess. Therefore, by creating the wall-face recess on the outer wall face of the first cooling wall and the outer wall face of the second cooling wall, the flow of the cooling medium is further facilitated, and the released cooling medium can be spread to the surface of the battery unit more rapidly. In addition, the wall-face recess can provide an expansion space for the battery cell. Moreover, such arrangement prevents the cooling medium from being unable to be released smoothly due to the battery cell blocking the ruptured fragile portion when the battery is abnormal. Therefore, such arrangement is also conducive to the release of the cooling medium, and in turn, enables the cooling medium to spread to the surface of the battery cell more smoothly.

In some embodiments, the number of the fragile portion is one, and the fragile portion is located close to the top face of the battery cell in the third direction. Such arrangement is more conducive to the flow of the cooling medium. When the battery is abnormal and the fragile portion is ruptured, the cooling medium released from the ruptured fragile portion can be rapidly spread to the surface of the battery cell by the action of gravity.

In some embodiments, the number of the fragile portions is plural. The number of fragile portions located close to the top face of the battery cell in the third direction is greater than the number of fragile portions located in other positions. In this way, the cooling medium that gushes out can cover the major surface of the battery cell more quickly, thereby ensuring faster cooling of the battery, further facilitating the flow of the cooling medium, and allowing the released cooling medium to spread rapidly to the surface of the battery cell.

In some embodiments, the shape of the fragile portion is circular, triangular, or rectangular. Such arrangement is more conducive to the flow of the cooling medium. When the battery is abnormal and the fragile portion is ruptured, the cooling medium released from the ruptured fragile portion can be rapidly spread to the surface of the battery cell.

In some embodiments, the number of the cooling units is plural, and the plurality of cooling units are arranged between any two adjacent battery cells respectively. Therefore, by disposing a plurality of cooling units based on the number of battery cells, the cooling unit is disposed between any two adjacent battery cells, thereby dissipating heat of the battery more efficiently. In this case, when the battery is abnormal, the cooling unit can respond to the abnormality of any surface of any battery cell of the battery, thereby dissipating heat of the battery more efficiently.

In some embodiments, the plurality of battery cells are grouped into a plurality of battery units, and each battery unit includes the same number of battery cells. The number of the cooling units is plural, and the plurality of cooling units are arranged between any two adjacent battery cells respectively. Therefore, in view of the cost-effectiveness, the assembling efficiency, and fast charging and heat insulation requirements, a plurality of cooling units can be arranged between the battery units based on actual conditions, each battery unit containing a plurality of battery cells, thereby improving the assembling efficiency and reducing the manufacturing cost.

In some embodiments, the two electrode terminals are disposed on the top face of the battery cell or disposed on the two second side faces of the battery cell respectively. The number of the integrated unit is 1. The integrated unit is disposed on the bottom face of the plurality of battery cells across the plurality of battery cells along the first direction, and communicates with the cooling units. Therefore, the integrated unit can be disposed at the bottom of the battery in view of the overall size and grouping manner of the battery and based on the location of the electrode terminals, thereby cooling the battery 10 more efficiently.

In some embodiments, the two electrode terminals are disposed on the two second side faces of the battery cell respectively. The number of integrated units is 2. The two integrated units are disposed on the top face and the bottom face of the plurality of battery cells respectively across the plurality of battery cells along the first direction, and communicate with the cooling unit separately. In this way, for a circumstance in which the electrode terminals are disposed on two sides of the battery cell respectively, another integrated unit may be further disposed on the top of the battery in addition to 1 integrated unit disposed at the bottom of the battery and the cooling unit disposed between the battery cells, thereby implementing more efficient cooling for the battery from both the top and the bottom through the two integrated units.

In some embodiments, a heat transfer layer is further disposed between the cooling unit and the battery cell. In this way, the heat of the battery can be dissipated more efficiently.

According to a second aspect, an embodiment of this application further provides an electrical device. The electrical device includes the battery according to the first aspect of this application.

According to a third, an embodiment of this application further provides a method for manufacturing a battery. The method includes: (i) providing a plurality of battery cells, where the plurality of battery cells are arranged along a first direction; each of the battery cells includes two first side faces disposed opposite to each other in the first direction, two second side faces disposed opposite to each other in a second direction, a top face and a bottom face disposed opposite to each other in a third direction, and two electrode terminals; the first direction, the second direction, and the third direction are orthogonal to each other; and the first side faces are larger than the second side faces in area; (ii) providing a cooling component, where the cooling component contains a cooling medium to cool the battery cells, the cooling component includes a cooling unit and an integrated unit; the cooling unit is in a plate shape formed by a first cooling wall and a second cooling wall that are opposite to each other in the first direction; and a channel available for flow of the cooling medium is formed between the first cooling wall and the second cooling wall; (iii) creating a fragile portion, and creating the fragile portion on the first cooling wall and the second cooling wall separately, so that, when the battery is abnormal, the fragile portion is able to rupture to release the cooling medium; and (iv) placing the cooling unit between two adjacent battery cells.

BRIEF DESCRIPTION OF DRAWINGS

The drawings described herein are intended to enable a further understanding of this application, and constitute a part of this application. The exemplary embodiments of this application and the description thereof are intended to explain this application but not to constitute any undue limitation on this application. In the drawings.

DETAILED DESCRIPTION OF EMBODIMENTS

Figure 1:
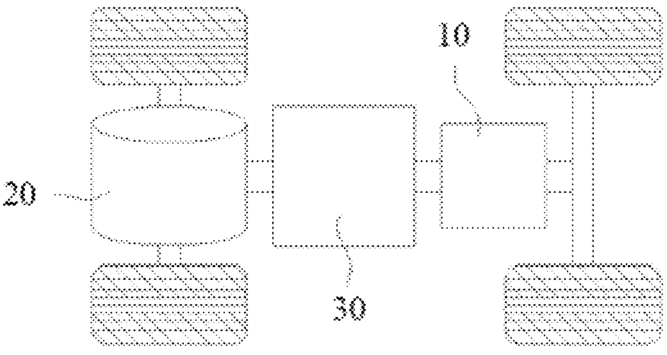
FIG. 1 is a schematic structural diagram of a vehicle according to an embodiment of this application.

Some embodiments of the technical solutions of this application are described in detail below with reference to the drawings. The following embodiments are merely intended as examples to describe the technical solutions of this application more clearly, but not intended to limit the protection scope of this application.

Unless otherwise defined, all technical and scientific terms used herein bear the same meanings as what is normally understood by a person skilled in the technical field of this application. The terms used herein are merely intended to describe specific embodiments but not to limit this application. The terms "include" and "contain" and any variations thereof used in the specification, claims, and brief description of drawings of this application are intended as non-exclusive inclusion.

In the description of the embodiments of this application, the technical terms "first" and "second" are merely intended to distinguish between different items but not intended to indicate or imply relative importance or implicitly specify the number of the indicated technical features, specific order, or order of precedence. In the description of the embodiments of this application, unless otherwise expressly specified, "a plurality of" means two or more.

Reference to an "embodiment" herein means that a specific feature, structure or characteristic described with reference to this embodiment may be included in at least one embodiment of this application. Reference to this term in different places in the specification does not necessarily represent the same embodiment, nor does it represent an independent or alternative embodiment in a mutually exclusive relationship with other embodiments. A person skilled in the art explicitly and implicitly understands that the embodiments described herein may be combined with other embodiments.

In the description of embodiments of this application, the term "and/or" merely indicates a relationship between related items, and represents three possible relationships. For example, "A and/or B" may represent the following three circumstances: A alone, both A and B, and B alone. In addition, the character "/" herein generally indicates an "or" relationship between the item preceding the character and the item following the character.

In the description of embodiments of this application, the term "a plurality of" means two or more (including two). Similarly, "a plurality of groups" means two or more groups (including two groups), and "a plurality of pieces" means two or more pieces (including two pieces).

In the description of embodiments of this application, a direction or a positional relationship indicated by the terms such as "center", "longitudinal", "transverse", "length", "width", "thickness", "up", "down", "before", "after", "left", "right", "vertical", "horizontal", "top", "bottom", "in", "out", "clockwise", "counterclockwise", "axial", "radial", and "circumferential" is a direction or positional relationship based on the illustration in the drawings, and is merely intended for ease or brevity of description of embodiments of this application, but not intended to indicate or imply that the indicated device or component is necessarily located in the specified direction or constructed or operated in the specified direction. Therefore, such terms are not to be understood as a limitation on embodiments of this application.

In the description of the embodiments of this application, unless otherwise expressly specified and defined, the technical terms such as "mounting", "concatenation", "connection", and "fixing" need to be understood in a broad sense, for example, understood as a fixed connection or a detachable connection or integrally formed; or understood as a mechanical connection or an electrical connection; understood as a direct connection, or an indirect connection implemented through an intermediary; or understood as internal communication between two components or interaction between two components. A person of ordinary skill in the art can understand the specific meanings of the terms in the embodiments of this application according to specific situations.

A battery mentioned in embodiments of this application means a unitary physical module that includes a plurality of battery cells to provide a higher voltage and a higher capacity. The battery may include a plurality of electrically connected battery modules and a box. The plurality of battery modules are arranged in the space of the box. Generally, the box is hermetically sealed.

A battery module may include a plurality of battery cells and a frame. The frame encloses and fixes the plurality of battery cells to form a whole. Generally, the frame serves to fix a plurality of battery cells rather than play a role of sealing.

A battery cell includes an electrode assembly and an electrolyte solution. The electrode assembly includes a positive electrode plate, a negative electrode plate, and a separator. The battery cell works primarily by relying on shuttling of metal ions between the positive electrode plate and the negative electrode plate. The positive electrode plate includes a positive current collector and a positive active material layer. A surface of the positive current collector is coated with the positive active material layer. Of the current collector, a part not coated with the positive active material layer protrudes from a part coated with the positive active material layer, and the part not coated with the positive active material layer serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. A surface of the negative current collector is coated with the negative active material layer. Of the current collector, a part not coated with the negative active material layer protrudes from a part coated with the negative active material layer, and the part not coated with the negative active material layer serves as a negative tab. The negative current collector may be made of copper, and a negative active material may be carbon, silicon, or the like. In order to ensure passage of a large current without fusing off, the number of positive tabs is plural, and the plurality of positive tabs are stacked together; and the number of negative tabs is plural, and the plurality of negative tabs are stacked together. The separator may be made of a material such as polypropylene (PP) or polyethylene (PE). In addition, the electrode assembly may be of a jelly-roll type structure or a stacked type structure, without being limited herein.

In addition, the battery cell may be in the shape of a cylinder, a flat body, a cuboid, or the like. Depending on the form of packaging, battery cells are generally classed into three types: a cylindrical battery cell, a prismatic battery cell, and a pouch-type battery cell.

In the development of the battery technology, a plurality of design factors generally need to be considered, for example, performance indicators such as energy density, cycle life, discharge capacity, charge rate, and discharge rate. In addition, heat dissipation performance, stability, and safety of the battery need to be considered.

In an electrical device such as an electric vehicle, the battery used in the electrical device is usually formed of dozens or even thousands of battery cells. The battery cells are stacked to form a battery unit. The inventor finds that the battery generates a lot of heat during use, and needs to dissipate heat in time. If the heat of the battery is not dissipated in time, the lifespan of the battery will be greatly reduced, the charging performance will be severely impaired, and the stability of the battery will be reduced. In addition, one or more battery cells of the battery may be thermally runaway due to misuse. When the battery is thermally runaway, if the thermal runaway is not controlled in time, thermal spread may occur between the battery cells. The thermal spread causes the temperature of the battery to far exceed the actual operating temperature and damage the battery, and even leads to accidents such as burning and explosion of the battery. In view of this, a heat insulation pad is typically added between the close-fitting surfaces of the battery cells to prevent thermal spread.

However, the energy density of the battery and the battery cells keeps increasing with the growing requirements of people. When a battery cell thermally runaway, the temperature of the battery cell keeps rising, and the requirements on the heat insulation space between the battery cells and the heat insulation capabilities of the battery cells also become higher. The design scheme that simply adds a heat insulation pad between the close-fitting surfaces of the battery cells in the prior art is unable to cope with today's thermal runaway of battery cells of a high energy density.

In view of this, this application provides a battery. The battery includes: a plurality of battery cells, where the plurality of battery cells are arranged along a first direction. Each of the battery cells includes two first side faces disposed opposite to each other in the first direction, two second side faces disposed opposite to each other in a second direction, a top face and a bottom face disposed opposite to each other in a third direction, and two electrode terminals. The first direction, the second direction, and the third direction are orthogonal to each other. The first side faces are larger than the second side faces in area. The battery further includes a cooling component. The cooling component contains a cooling medium to cool the battery cells, and includes a cooling unit and an integrated unit. The cooling unit is in a plate shape formed by a first cooling wall and a second cooling wall that are opposite to each other in the first direction, and is disposed between two adjacent battery cells. A channel available for flow of the cooling medium is formed between the first cooling wall and the second cooling wall. The first cooling wall and the second cooling wall each include a fragile portion. When the battery is abnormal, the fragile portion is able to rupture to release the cooling medium.

Here, the abnormality of the battery may be, for example, a circumstance in which the temperature of the battery is far higher than the critical temperature of the battery due to excessive or improper use of the battery or use of the battery in an extreme environment, or due to a fault or other reasons, and in which even thermal runaway such as explosion and burning of the battery occurs.

According to this technical solution, a cooling component that includes an integrated unit and a plate-shaped cooling unit is disposed in the battery, the cooling medium for cooling the battery cells is contained in the cooling component, and the plate-shaped cooling unit is disposed between two adjacent battery cells. In this way, in a normal use state of the battery, the cooling unit between the battery cells can more quickly dissipate the heat out of the battery when the heat is generated by the battery in use, thereby rapidly reducing the temperature of the battery, improving the heat dissipation capability of the product, and improving the fast-charging performance. In addition, the cooling unit is formed into a plate shape through two cooling walls, and is arranged between two adjacent battery cells so as to fit the battery cells and sufficiently contact the battery cells. In this way, when the battery is abnormal such as thermally runaway, the cooling unit located between the battery cells and fully in contact with the battery cells can greatly retard the heat transfer on the close-fitting surface of the battery cells, thereby greatly alleviating the risk of thermal/heat spread between the battery cells. In addition, fragile portions are disposed on the two cooling walls of the cooling unit. When the battery is abnormal such as thermally runaway, the fragile portions can be more easily ruptured than the remaining part of the cooling walls. The rupture of the fragile portion leads to rapid release of the cooling medium that flows in the cooling unit, and spreads the cooling medium quickly throughout the surface of the battery cell to implement rapid cooling. Even if the battery is thermally runaway or even in a case of burning and explosion, the technical solution hereof can still cope with the emergency quickly to ensure safety, and achieve a trade-off between the heat dissipation performance, stability, and safety of the battery.

Some embodiments of this application provide a device. The device includes the battery, and the battery is configured to provide electrical energy. Optionally, the device may be a vehicle, watercraft, spacecraft, or the like.

All technical solutions described in the embodiments of this application are applicable to various devices such as a mobile phone, a portable device, a laptop computer, an electric power cart, an electrical toy, an electric tool, an electric vehicle, a ship, and a spacecraft. The spacecraft includes an airplane, a rocket, a space shuttle, a spaceship, and the like.

Understandably, the technical solutions described in the embodiments of this application are not only applicable to the devices mentioned above, but also applicable to all battery-powered devices. However, for brevity, the following embodiments are described by using an electric vehicle as an example.

For example, as shown in FIG. 1, which is a schematic structural diagram of a vehicle 1 according to an embodiment of this application, the vehicle 1 may be an oil-fueled vehicle, a natural gas vehicle, or a new energy vehicle. The new energy vehicle may be a battery electric vehicle, a hybrid electric vehicle, a range-extended electric vehicle, or the like. A motor 20, a controller 30, and a battery 10 may be disposed inside the vehicle 1. The controller 30 is configured to control the battery 10 to supply power to the motor 20. For example, the battery 10 may be disposed at the bottom, front, or rear of the vehicle 1. The battery 10 may be configured to supply power to the vehicle 1. For example, the battery 10 may serve as an operating power supply of the vehicle 1 to power a circuit system of the vehicle 1. For example, the battery may be configured to meet operating power usage requirements of the vehicle 1 that is being started or navigated or running. In another embodiment of this application, the battery 10 serves not only as an operating power supply of the vehicle 1, but may also serve as a driving power supply of the vehicle 1 to provide driving power for the vehicle 1 in place of or partly in place of fuel oil or natural gas.

To meet different power usage requirements, the battery may include a plurality of battery cells. The plurality of battery cells may be connected in series, parallel, or series-and-parallel pattern. The series-and-parallel pattern means a combination of series connection and parallel connection. The battery may also be referred to as a battery pack. Optionally, the plurality of battery cells may be connected in series, parallel, or series-and-parallel pattern to form a battery module, and then a plurality of battery modules may be connected in series, parallel, or series-and-parallel pattern to form the battery. In other words, the plurality of battery cells may directly form the battery, or form the battery modules that are then used to form the battery.

In addition, the battery may further include a box and an end plate. The battery unit (battery module) and the end plate are both disposed in the box, and the end plate may be disposed between the battery unit (battery module) and the inner wall of the box. In the following description, for ease of understanding, the components such as the box that are not closely related to the gist of this application are omitted.

Figure 2:
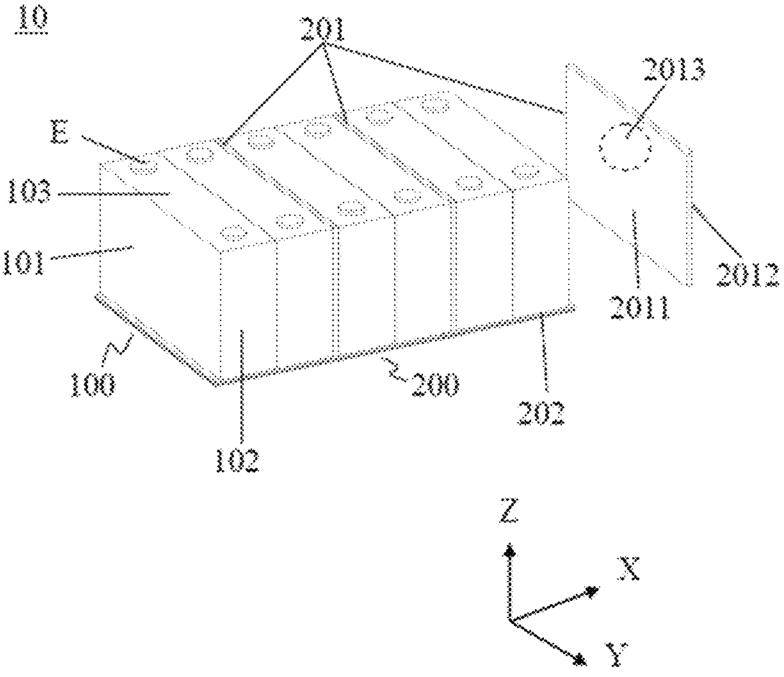
FIG. 2 is a three-dimensional diagram of a basic structure of a battery according to an embodiment of this application.

Specifically, as shown in FIG. 2, this application provides a battery 10. The battery includes a plurality of battery cells 100 and a cooling component 200. The plurality of battery cells 100 are arranged along a first direction X (thickness direction of the battery 10). Each battery cell 100 includes two first side faces 101 disposed opposite to each other in the first direction X, two second side faces 102 disposed opposite to each other in a second direction (length direction of the battery 10), a top face (103) and a bottom face (104) disposed opposite to each other in a third direction Z (height direction of the battery 10), and two electrode terminals E. The first direction X, the second direction Y, and the third direction Z are orthogonal to each other. The first side faces 101 are larger than the second side faces 102 in area. In addition, as shown in FIG. 2 to FIG. 6, the cooling component 200 includes a cooling unit 201 and an integrated unit 202. The cooling component 200 contains a cooling medium configured to cool the battery cells 100 (battery 10). The cooling unit 201 is in a plate shape formed by a first cooling wall 2011 and a second cooling wall 2012 opposite to each other in the first direction X, and is disposed between two adjacent battery cells 100. A channel available for flow of the cooling medium is formed between the first cooling wall 2011 and the second cooling wall 2012. In addition, as shown in FIG. 2 to FIG. 8, a fragile portion 2013 is created on the first cooling wall 2011 and the second cooling wall 2012 separately. When the battery 10 is abnormal, the fragile portion 2013 is able to rupture to release the cooling medium. In FIG. 2, for ease of understanding, a single cooling unit 201 is shown on the rightmost side. In an actually assembled battery 10, the cooling unit 201 is located between two adjacent battery cells 100 (for example, as shown in FIG. 4). Understandably, FIG. 2 is a schematic diagram showing a single cooling unit 201 on the rightmost just for ease of illustration.

Figure 5:
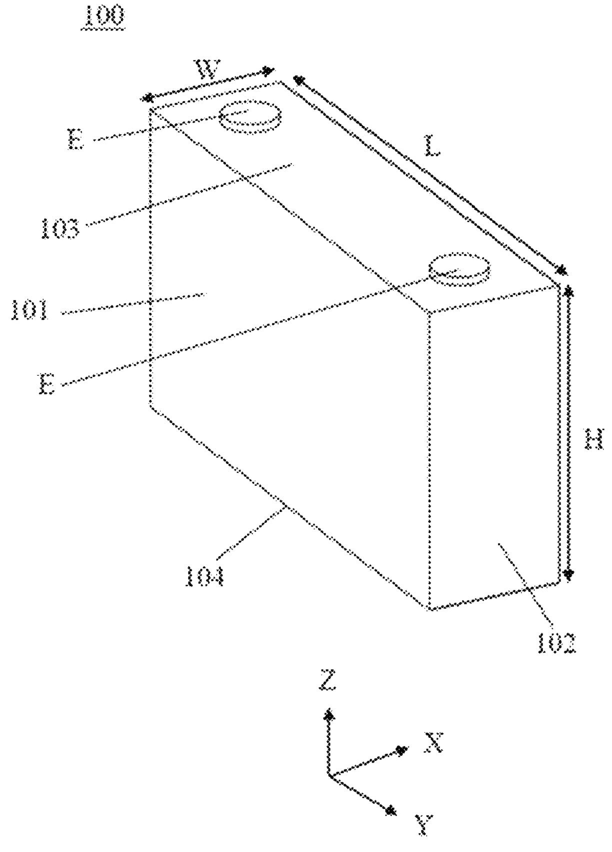
FIG. 5 is a three-dimensional structural diagram of a battery cell according to an embodiment of this application.

In some embodiments of this application, for example, as shown in FIG. 5, which is a three-dimensional diagram of a battery cell 100 in a specific embodiment of this application, the battery cell 100 is roughly in the shape of a cuboid. A first side face 101 is a largest face of the battery cell 100 in area. Both electrode terminals E are disposed on the top face 103 of the battery cell 100. The arrangement of both electrode terminals E on the top face 103 of the battery cell 100 is merely an example here. In an alternative arrangement, the two electrode terminals E are disposed on the second side faces 102 of the battery cell 100 respectively, as shown in FIG. 45 to FIG. 48. In addition, for ease of description, the length of the battery cell 100 is denoted by L, the thickness of the battery cell is denoted by W, and the height of the battery cell is denoted by H. In other words, the first direction X is also the thickness direction (W direction) of the battery cell 100, the second direction Y is also the length direction (L direction) of the battery cell 100, and the third direction Z is also the height direction (H direction) of the battery cell 100. The first direction X, the second direction Y, and the third direction Z are orthogonal to each other.

Figure 3:
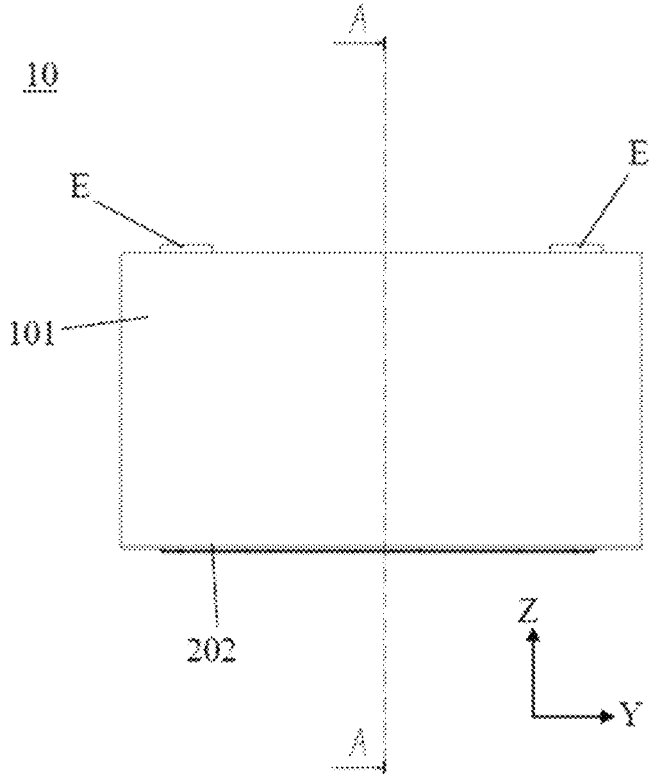
FIG. 3 is a front view of a battery viewed from a first direction (X direction) according to an embodiment of this application.
Figure 4:
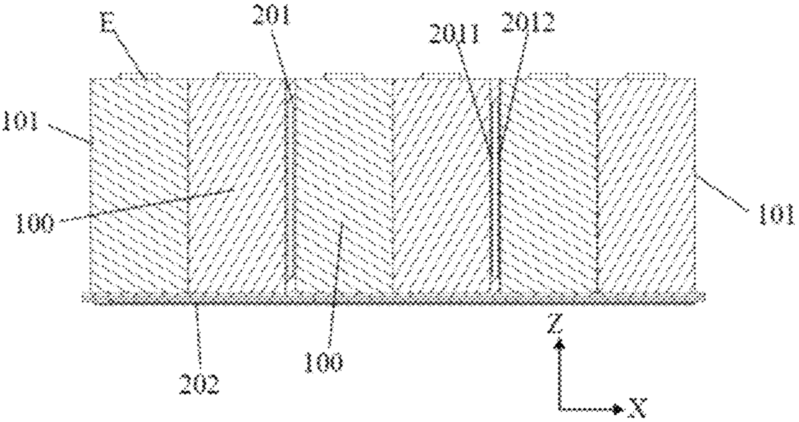
FIG. 4 is a cross-sectional view of a battery sectioned along an A-A line shown in FIG. 3 according to an embodiment of this application.

In addition, FIG. 4 is a cross-sectional view of an assembly structure of a battery 10 in a specific embodiment of this application, and specifically, is a cross-sectional view of FIG. 3 sectioned along the A-A line. As shown in FIG. 4, a plate-shaped cooling unit 201 is formed by the first cooling wall 2011 and the second cooling wall 2012 opposite to each other in the first direction X, and is located between two adjacent battery cells 100. The first cooling wall 2011 of the cooling unit 201 fits the first side face 101 of one battery cell 100 among the two adjacent battery cells 100, and the second cooling wall 2012 of the cooling unit 201 fits the first side face 101 of the other battery cell 100 among the two adjacent battery cells 100.

By disposing the plate-shaped cooling unit 201 between two adjacent battery cells 100, the first cooling wall 2011 and the second cooling wall 2012 of the cooling unit 201 fit the first side faces 101 of the adjacent battery cells 100 respectively. In this way, in a normal use state of the battery, the cooling unit 201 between the battery cells 100 can more quickly dissipate the heat out of the battery 10 when the heat is generated by the battery in use, thereby rapidly reducing the temperature of the battery 10, improving the heat dissipation capability of the product, and improving the fast-charging performance.

In addition, the cooling unit 201 is formed into a plate shape by use of the two cooling walls (the first cooling wall 2011 and the second cooling wall 2012), and is arranged between two adjacent battery cells 100. In this way, the first cooling wall 2011 and the second cooling wall 2012 fit the first side faces 101 of the adjacent battery cells 100 respectively, and therefore, the cooling unit 201 can sufficiently contact the battery cells 100. When the battery 10 is abnormal such as thermally runaway, the cooling unit 201 located between the battery cells 100 and fully in contact with the battery cells 100 can greatly retard the heat transfer on the close-fitting surface of the battery cells 100, thereby greatly alleviating the risk of thermal/heat spread between the battery cells 100.

In some embodiments of this application, the cooling component 200 serves as a cooling system connected to an external water-cooled chiller (not shown in the drawing). The cooling component 200 is pressurized by the water-cooled chiller. In this way, the cooling medium can flow into the cooling unit 201 and the integrated unit 202 from one end of the cooling component 200, pass through the clearance between the battery cells 100, and flow out from the other end of the cooling component 200, so as to circulate the cooling medium. By accelerating the cooling of the battery cells 100 by use of the cooling medium, the temperature balance of the battery cells 100 can be ensured, thereby enhancing the flow passage heat dissipation of the battery cells 100 and improving the fast-charging performance. In addition, when a battery cell 100 is abnormal, the cooling unit can retard the heat transfer between the battery cells 100 along a direction in which the battery cells 100 closely fit each other, and accelerate the heat dissipation of the abnormal battery cell 100, thereby reducing the risk of thermal diffusion between adjacent battery cells 100.

In addition, as shown in FIG. 2 to FIG. 9, a fragile portion 2013 is created on the first cooling wall 2011 and the second cooling wall 2012 separately. When the battery 10 is abnormal, the fragile portion 2013 is able to rupture to release the cooling medium.

Here, as mentioned above, the abnormality of the battery 10 may be, for example, a circumstance in which the temperature of the battery is far higher than the critical temperature of the battery due to excessive or improper use of the battery or use of the battery in an extreme environment, or due to a fault or other reasons, and in which even thermal runaway such as explosion and burning of the battery occurs. In this case, by disposing the fragile portion 2013 on the first cooling wall 2011 and the second cooling wall 2012 separately, the physical strength of the part equipped with the fragile portion 2013 on the first cooling wall 2011 and the second cooling wall 2012 is less than the physical strength of the remaining part of the first cooling wall 2011 and the second cooling wall 2012. Therefore, the fragile portion 2013 becomes a local fragile point of the first cooling wall 2011 and the second cooling wall 2012. In this case, when the battery 10 is in normal use, the heat generated by the battery 10 will not damage the fragile portion 2013 (local fragile point). However, when the battery 10 falls in the foregoing abnormal circumstances such as thermal runaway, a large amount of heat dissipated by the battery 10 will damage the fragile portion 2013 (local fragile point) (for example, thermally melting the fragile portion or thermally melting through the fragile portion). In this way, the fragile portion 2013 is ruptured, and the cooling medium that flows in the cooling unit 201 keeps gushing out from the ruptured fragile portion 2013, or keeps spraying out from the ruptured fragile portion 2013 as driven by the pressuring water-cooled chiller, and sprays onto the surface of the adjacent battery cell 100 that is thermally runaway and all other abnormal parts in the battery 10. In this case, because the cooling medium rapidly undergoes a phase transition after meeting a high-temperature interface, the cooling medium gushing out from the ruptured fragile portion 2013 takes away a large amount of heat, thereby achieving an effect of rapidly cooling the battery 10.

In addition, in some embodiments, the cooling component 200 serving as a cooling system is also interlocked with a battery alarm system (not shown in the drawing). Specifically, when recognizing a dangerous situation such as thermal runaway inside the battery 10, the alarm system controls the output power of the water-cooled chiller and increases the output power to increase the circulation rate of the cooling medium in the cooling component 200. In this way, as the same time as improving the heat dissipation rate of the product, the fragile portion 2013 will be burst due to an increase of backpressure between the cooling walls caused by the increase in the flow rate of the cooling medium, thereby rupturing the fragile portion 2013 and making the cooling medium in the cooling component 200 gush out from the fragile portion 2013 to implement rapid cooling of the product.

Therefore, in the above technical solution of this application, during the use of the battery, the cooling unit between the battery cells can more quickly dissipate the heat out of the battery when the heat is generated by the battery in a normal use state, thereby rapidly reducing the temperature of the battery, improving the heat dissipation capability of the product, and improving the fast-charging performance. In addition, when the battery is abnormal such as thermally runaway, the cooling unit located between the battery cells and fully in contact with the battery cells can greatly retard the heat transfer on a close-fitting surface of the battery cell, thereby greatly alleviating the risk of thermal/heat spread between the battery cells. In addition, the fragile portions disposed on the two cooling walls of the cooling unit can be utilized. When the battery is abnormal such as thermally runaway, the fragile portions are caused to rupture to rapidly release the cooling medium that flows in the cooling unit. The cooling medium is rapidly spread throughout the surface of the battery cell to implement rapid cooling. Even if the battery is thermally runaway or even in an emergency of burning and explosion, the technical solution hereof can still cope with the emergency quickly to ensure safety, and achieve a trade-off between the heat dissipation performance, stability, and safety of the battery.

Figure 9:
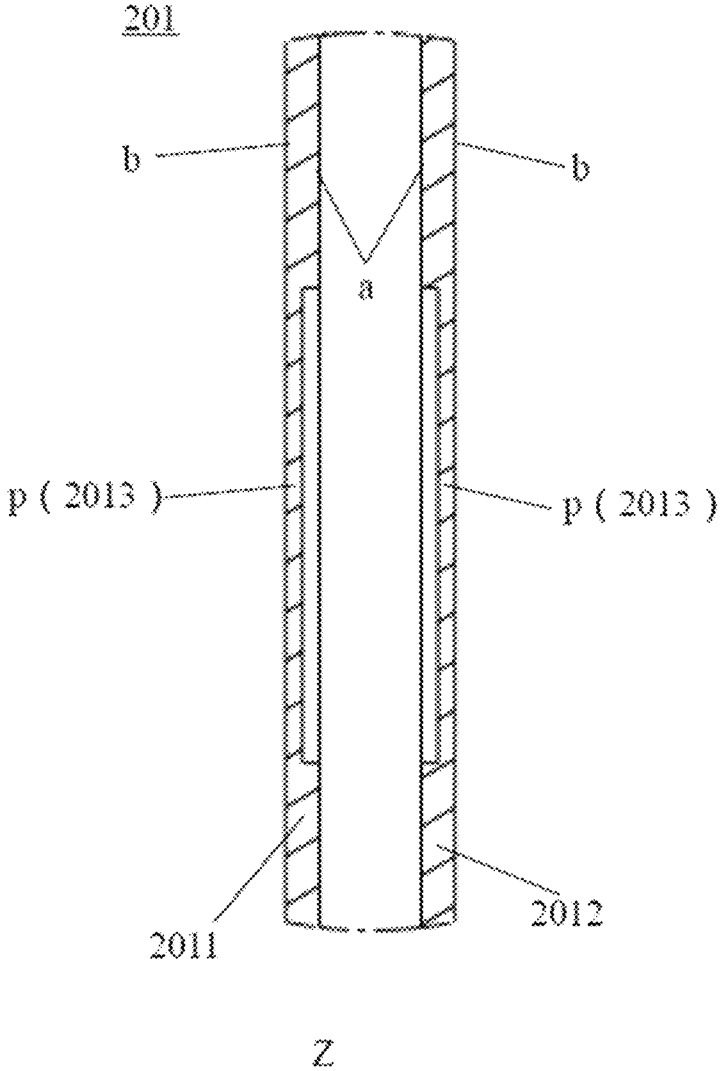
FIG. 9 is a close-up view of a circled part B shown in FIG. 8.
Figure 10:
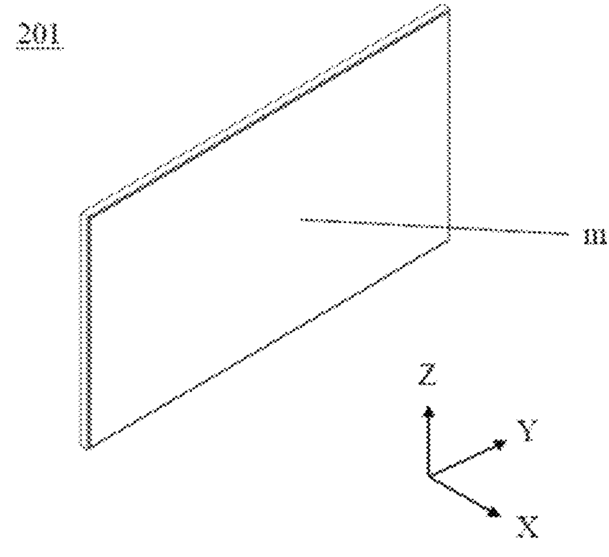
FIG. 10 is a three-dimensional structural diagram of a cooling unit according to another embodiment of this application.
Figure 11:
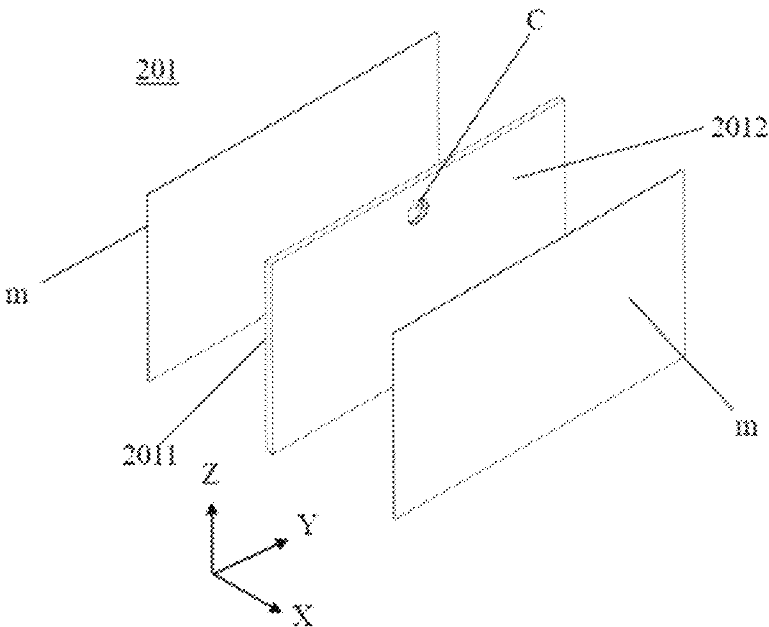
FIG. 11 is an exploded view of a structure of a cooling unit according to another embodiment of this application.
Figure 12:
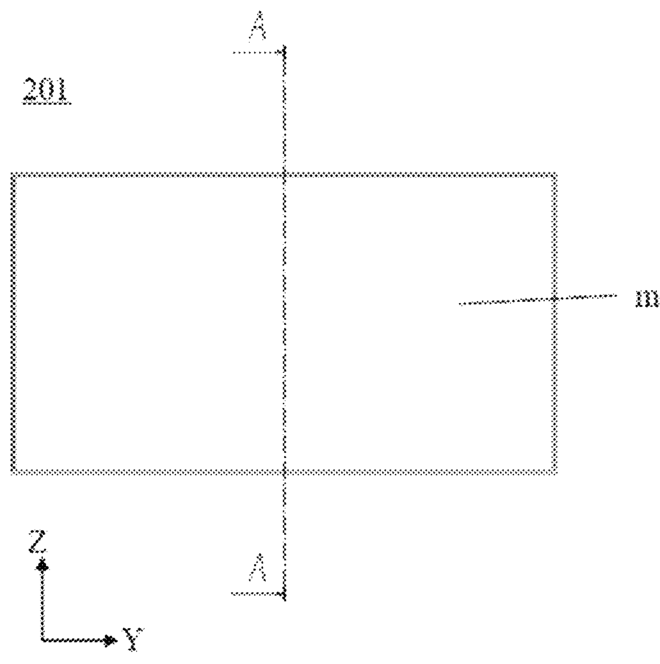
FIG. 12 is a front view of a cooling unit viewed from a first direction (X direction) according to another embodiment of this application.
Figure 13:
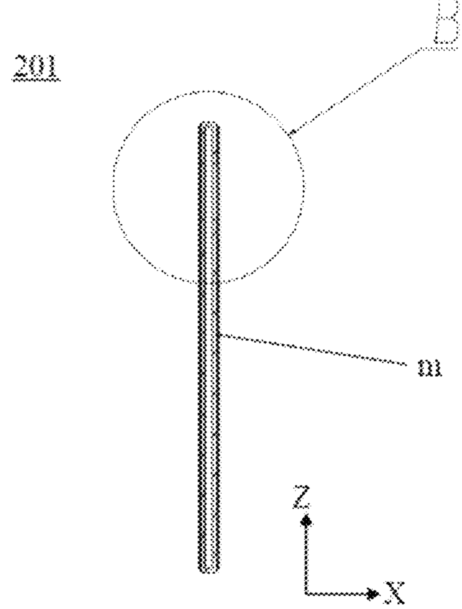
FIG. 13 is a cross-sectional view of a cooling unit sectioned along an A-A line shown in FIG. 12 according to another embodiment of this application.
Figure 14:
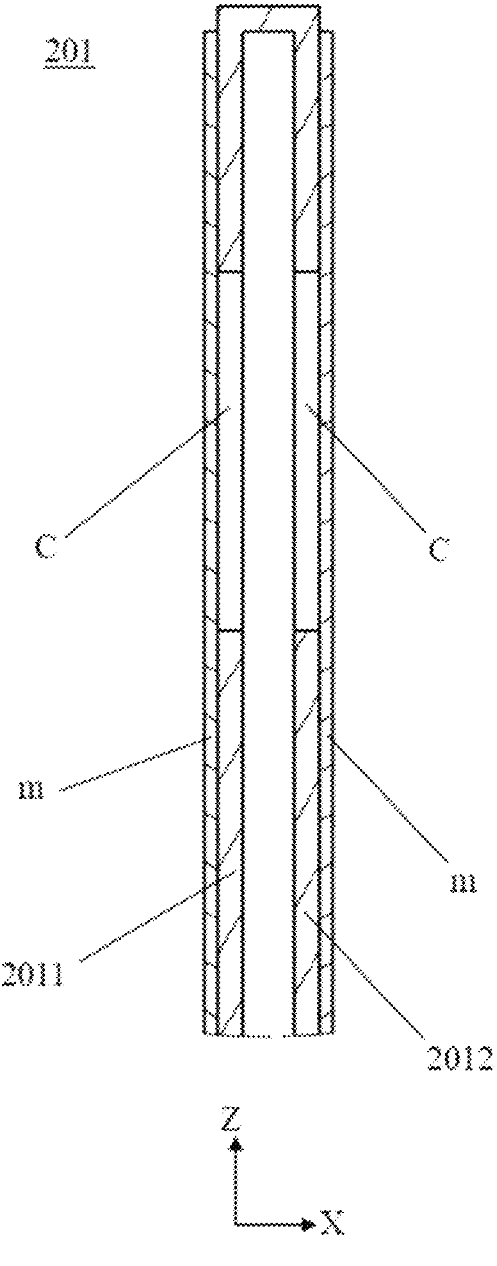
FIG. 14 is a close-up view of a circled part B shown in FIG. 13.

In some embodiments of this application, as shown in FIG. 9, the fragile portion 2013 may include a thin-walled portion p. A wall thickness of the thin-walled portion p is less than a wall thickness of the remaining part of the first cooling wall 2011 and the second cooling wall 2012.

An exemplary method for forming the thin-walled portion p is to thin a local part of the first cooling wall 2011 and the second cooling wall 2012 (for example, thin the fragile portion 2013) under the premise of ensuring the normal operation of the cooling medium and the normal reliable use of the battery, so that the thin-walled portion p can be burst or melted through more easily when the battery is abnormal. Moreover, because the thin-walled portion p can be formed just by thinning the wall of the first cooling wall 2011 and the second cooling wall 2012, the fragile portions 2013 can be implemented just through simple operations without involving a complicated manufacturing process.

In some embodiments of this application, as shown in FIG. 9, the first cooling wall 2011 and the second cooling wall 2012 each include an inner wall face a and an outer wall face b. The thin-walled portion p is formed by reducing the wall thickness by starting from the inner wall face a of the first cooling wall 2011 and the inner wall face of the second cooling wall 2012.

By reducing the wall thickness from the inner wall face a, the levelness of the outer wall face b is maintained, and the outer wall face b is brought into close contact with the battery cell 100 adjacent to the cooling wall. Therefore, when the battery cell 100 is abnormal, because the entire surface of the outer wall face b is in close contact with the battery cell 100, the heat generated by the battery can be quickly transferred to the thin-walled portion p to rupture the thin-walled portion.

In some embodiments of this application, the thickness of the first cooling wall 2011 is identical to the thickness of the second cooling wall 2012, and is 0.2 mm to 1.5 mm. The thickness of the thin-walled portion p is less than or equal to 0.2 mm. Under the premise of ensuring the normal operation of the cooling medium and the reliable normal use of the battery, the thickness of the thin-walled portion p is made as thin as practicable. For example, in contrast to the thickness (0.2 mm to 1.5 mm) of the first cooling wall 2011 and the second cooling wall 2012, the thickness of the thin-walled portion p is reduced to less than or equal to 0.2 mm, thereby ensuring that the thin-walled portion can be more easily melted or burst through when the battery is abnormal.

In addition, as a specific example, in view of the limited clearance between the battery cells and in order to improve the heat dissipation effect, preferably the cooling unit may be formed by combining two thin aluminum sheets by welding. A flow channel available for flow of a liquid cooling medium may be disposed between the two aluminum sheets. Preferably, the thickness of the flow channel is 0.5 mm to 5 mm, and more preferably, the thickness of the flow channel is 2 mm. In addition, the cooling medium used in the cooling unit is preferably a water-based coolant with a high frost resistance and a high specific heat capacity, for example, ethylene glycol-water type, ethanol-water type, or glycerol-water type. However, this application is not limited to the examples given above. The above content is merely an example enumerated for ease of description, and various changes may be made to this application on the basis of such content.

In some embodiments of this application, as shown in FIG. 10 to FIG. 14, a through-hole C is created in the first cooling wall 2011 and the second cooling wall 2012 separately. The cooling unit 201 further includes a thin film m covering at least the through-hole C. The fragile portion 2013 is formed by the through-hole C and the thin film m.

By creating a hole and applying a film on the first cooling wall 2011 and the second cooling wall 2012, the fragile portion 2013 can be implemented just through simple operations without involving a complicated manufacturing process. In addition, by forming the fragile portion 2013 by covering the through-hole C with a thin film m, the thin film m can be broken more easily than the thin-walled portion p formed by thinning the wall. Therefore, the fragile portion can respond more quickly to changes in the battery temperature.

In a preferred technical solution of this embodiment, a 1 mm to 5 mm through-hole C is disposed on the first cooling wall 2011 and the second cooling wall 2012 separately, and the surfaces of the first cooling wall 2011 and the second cooling wall 2012 are covered with a plastic film used as the thin film m. The plastic film is made of a material such as polypropylene (PP) plastics, perfluoroalkoxy (PFA) alkane, or polyimide (PI) plastics. The thickness of the plastic film is 0.1 mm to 0.3 mm. In addition, further preferably, a side of the plastic film, which closely fits the first cooling wall 2011 and the second cooling wall 2012, is coated with a back adhesive.

In some embodiments of this application, the thickness of the first cooling wall 2011 is identical to the thickness of the second cooling wall 2012, and is 0.2 mm to 1.5 mm. The thickness of the thin film m is 0.1 mm to 0.3 mm.

Under the premise of ensuring the normal operation of the cooling medium and the reliable normal use of the battery, the thickness of the thin film m is made as thin as practicable. For example, in contrast to the thickness (0.2 mm to 1.5 mm) of the first cooling wall 2011 and the second cooling wall 2012, the thickness of the thin film m is reduced to 0.1 mm to 0.3 mm, thereby ensuring that the thin film can be more easily melted or burst through when the battery is abnormal. In addition, in contrast to the process of thinning the first cooling wall 2011 and the second cooling wall 2012, the process of creating a hole and applying a film on the first cooling wall 2011 and the second cooling wall 2012 enables selection of thin films m of different thicknesses for different types of batteries and different application environments based on the actual situation, and is more flexibly applicable.

In some embodiments of this application, as shown in FIG. 15 to FIG. 32, a linear wall-face flow channel T recessed from an outer wall face b is created on the outer wall face b of the first cooling wall 2011 and the outer wall face of the second cooling wall 2012. In a plan view viewed from the first direction X, the linear wall-face flow channel T partially overlaps the fragile portion 2013.

The disposed linear wall-face flow channel T facilitates the flow of the cooling medium gushing out from the ruptured fragile portion 2013 when the battery is abnormal, and enables the released cooling medium to spread to the surface of the battery cell 100 more quickly.

Figure 15:
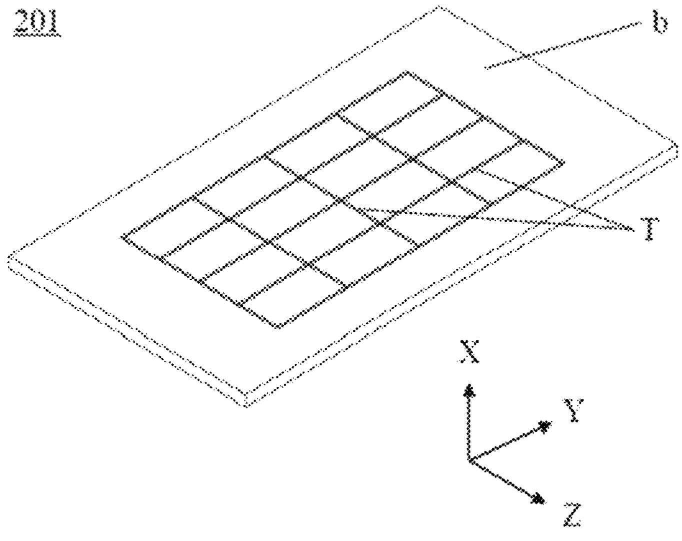
FIG. 15 is a three-dimensional structural diagram of a cooling unit according to still another embodiment of this application.
Figure 16:
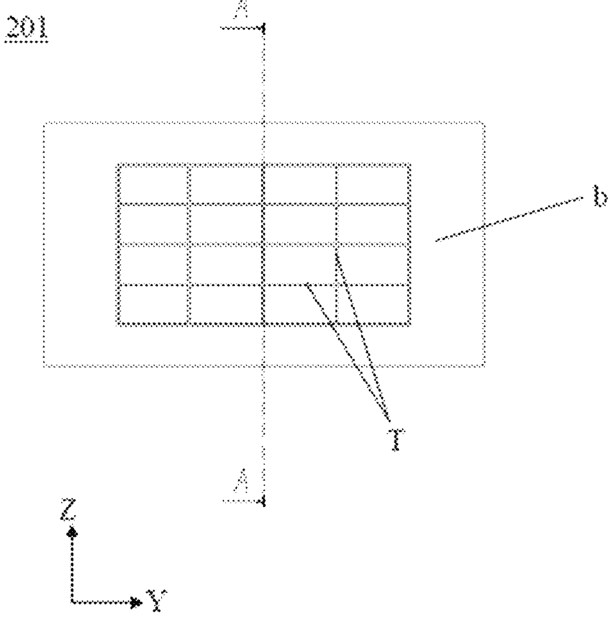
FIG. 16 is a front view of a cooling unit viewed from a first direction (X direction) according to still another embodiment of this application.
Figure 17:
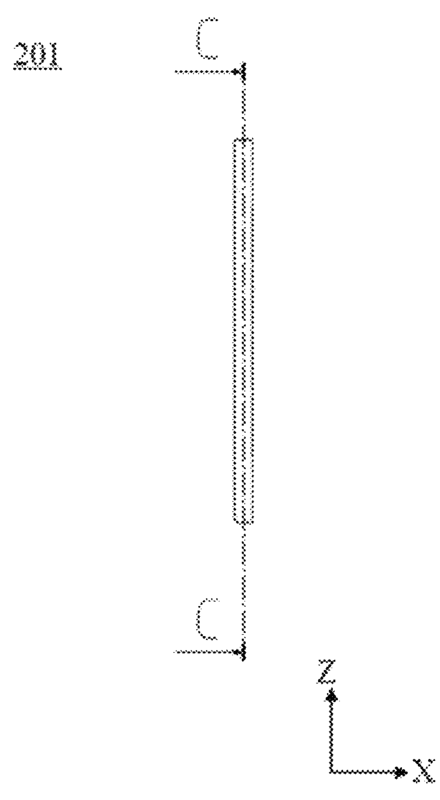
FIG. 17 is a side view of a cooling unit viewed from a second direction (Y direction) according to still another embodiment of this application.
Figure 21:
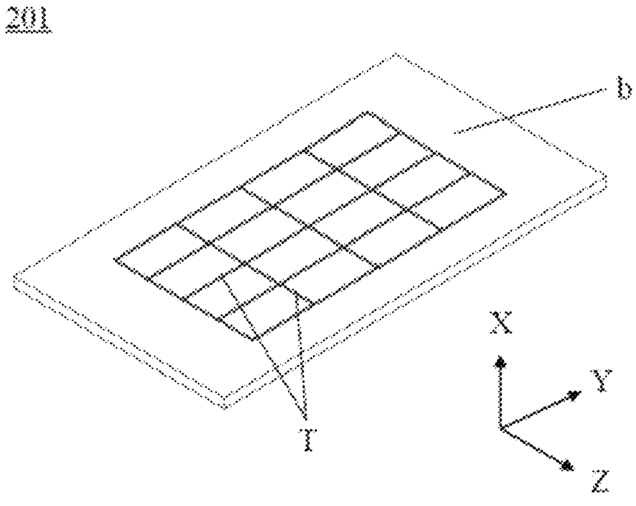
FIG. 21 is a three-dimensional structural diagram of a cooling unit according to another embodiment of this application.
Figure 22:
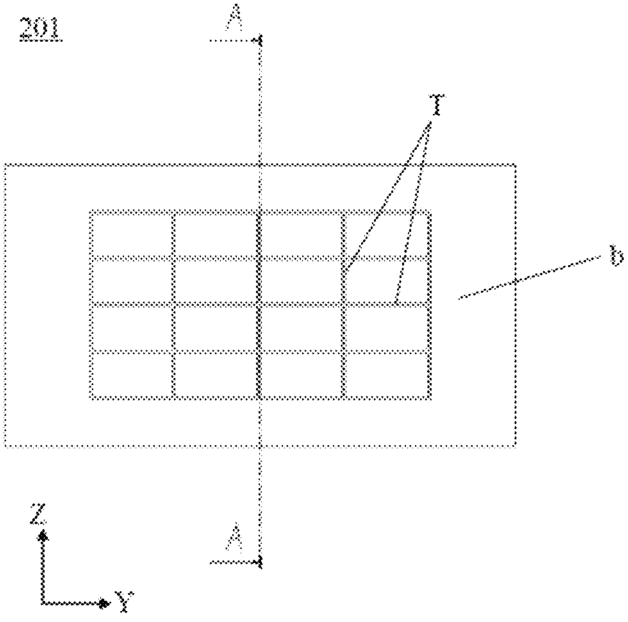
FIG. 22 is a front view of a cooling unit viewed from a first direction (X direction) according to another embodiment of this application.
Figure 23:
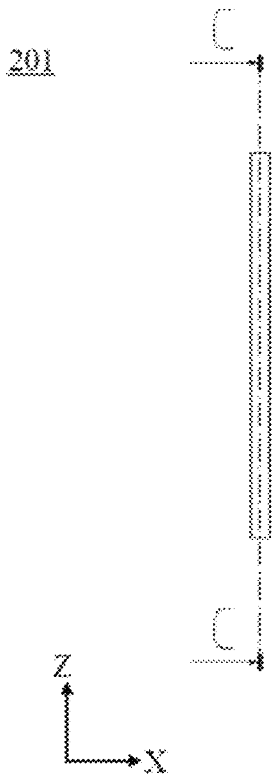
FIG. 23 is a side view of a cooling unit viewed from a second direction (Y direction) according to another embodiment of this application.
Figure 27:
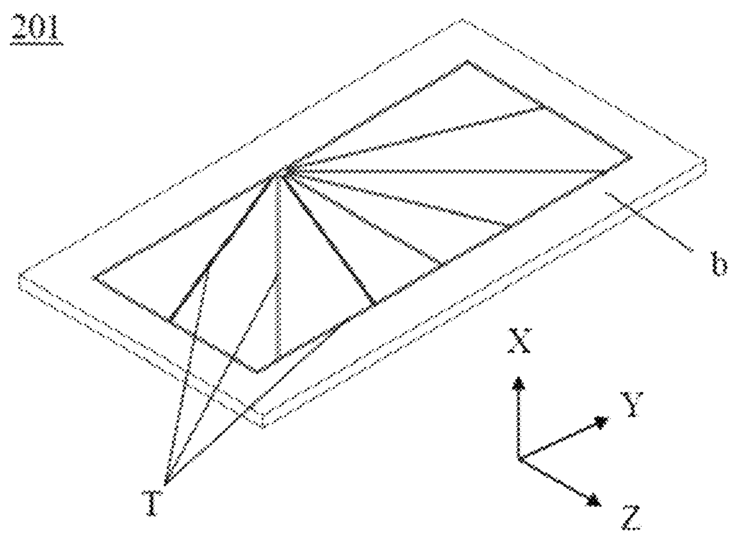
FIG. 27 is a three-dimensional structural diagram of a cooling unit according to an alternative embodiment of this application.
Figure 28:
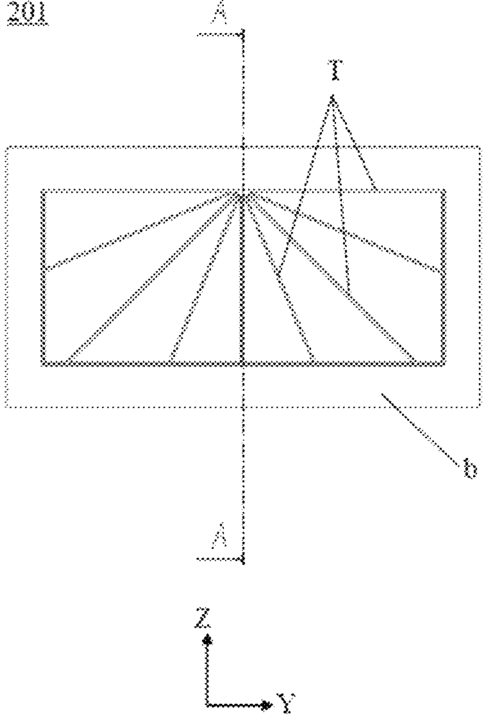
FIG. 28 is a front view of a cooling unit viewed from a first direction (X direction) according to an alternative embodiment of this application.
Figure 29:
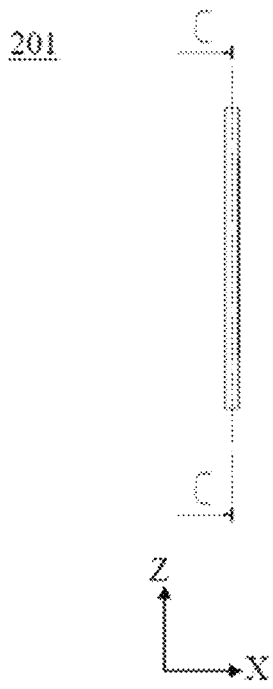
FIG. 29 is a side view of a cooling unit viewed from a second direction (Y direction) according to an alternative embodiment of this application.
Figure 30:
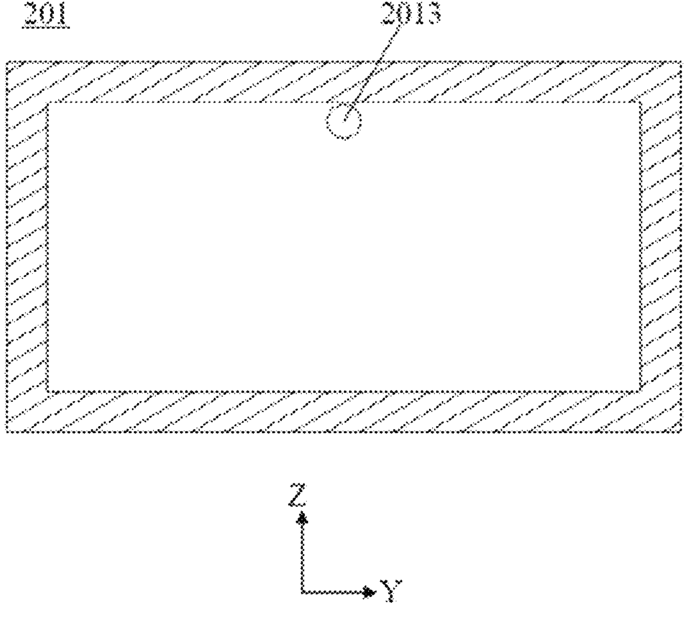
FIG. 30 is a cross-sectional view of a cooling unit sectioned along a C-C line shown in FIG. 29 according to an alternative embodiment of this application.
Figure 31:
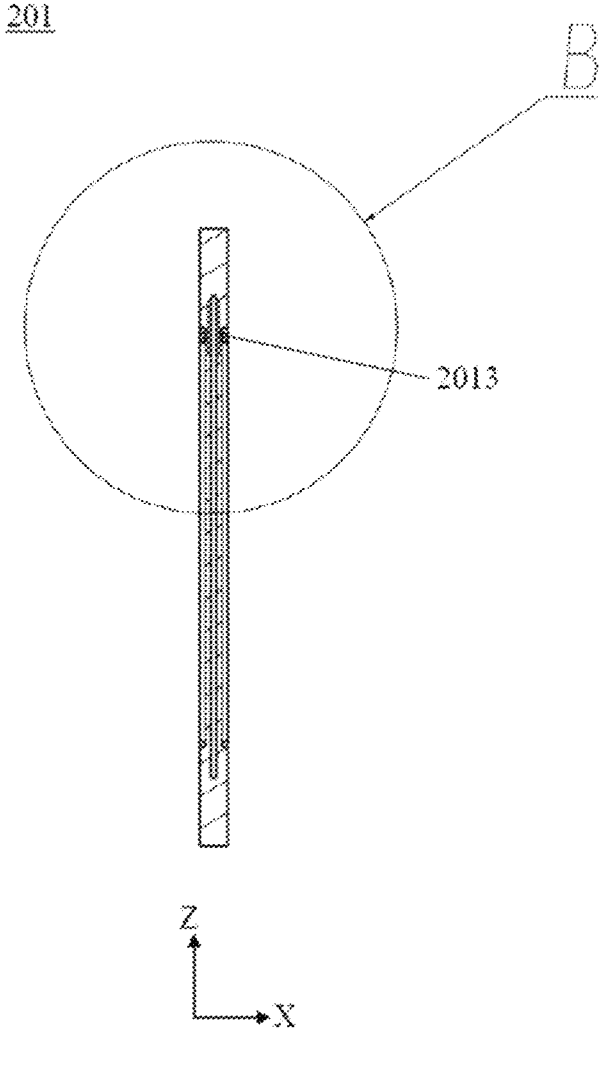
FIG. 31 is a cross-sectional view of a cooling unit sectioned along an A-A line shown in FIG. 28 according to an alternative embodiment of this application.
Figure 32:
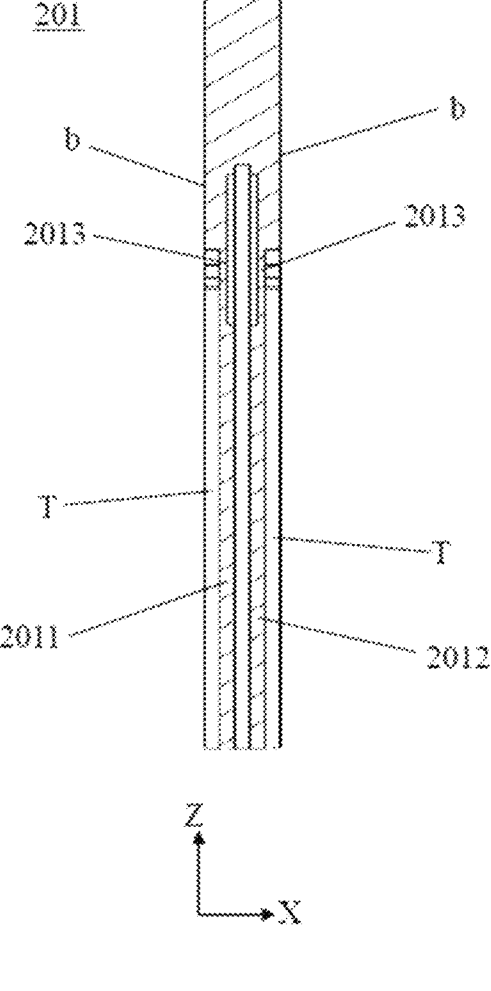
FIG. 32 is a close-up view of a circled part B shown in FIG. 31.
Figure 33:
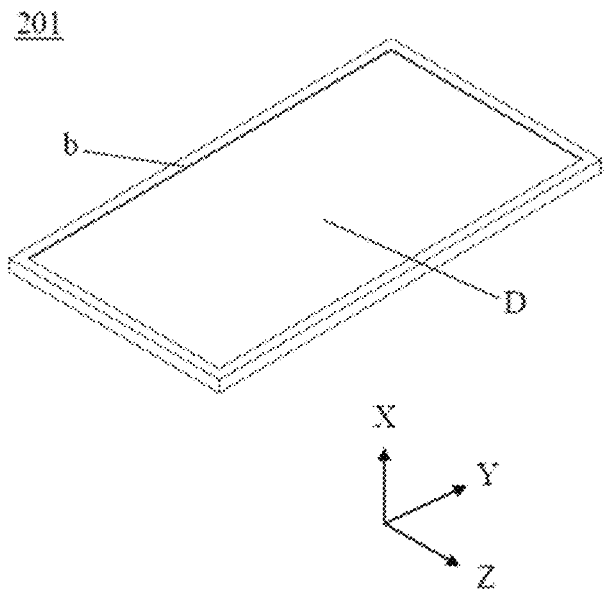
FIG. 33 is a three-dimensional structural diagram of a cooling unit according to another alternative embodiment of this application.
Figure 34:
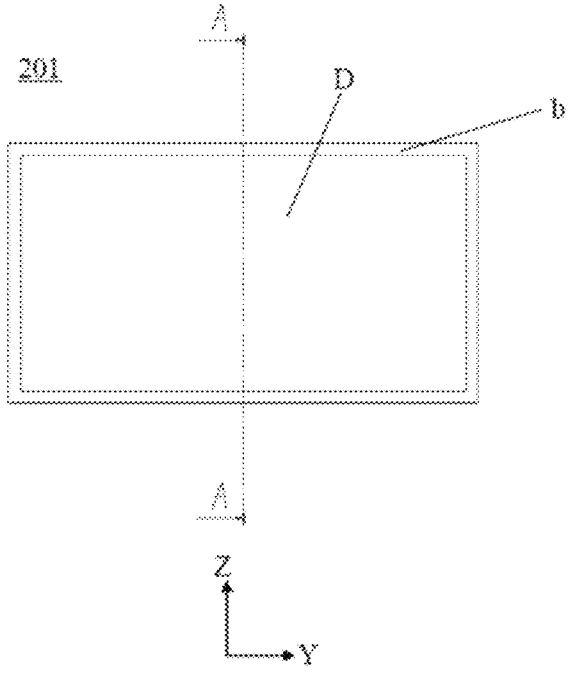
FIG. 34 is a front view of a cooling unit viewed from a first direction (X direction) according to another alternative embodiment of this application.
Figure 35:
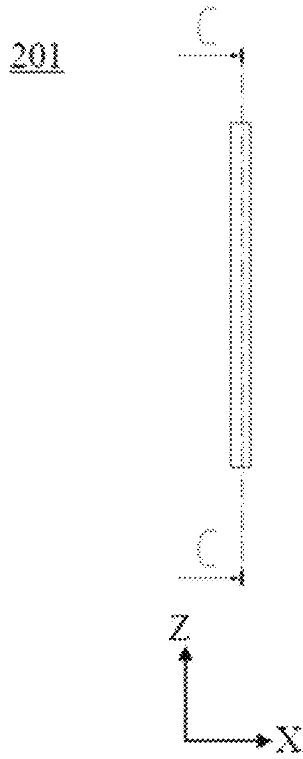
FIG. 35 is a side view of a cooling unit viewed from a second direction (Y direction) according to another alternative embodiment of this application.
Figure 36:
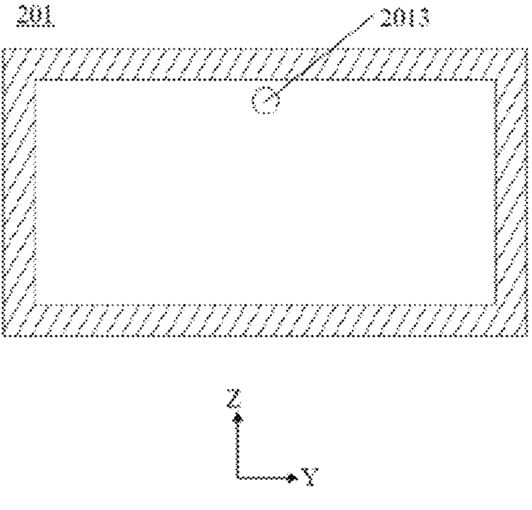
FIG. 36 is a cross-sectional view of a cooling unit sectioned along a C-C line shown in FIG. 35 according to another alternative embodiment of this application.
Figure 37:
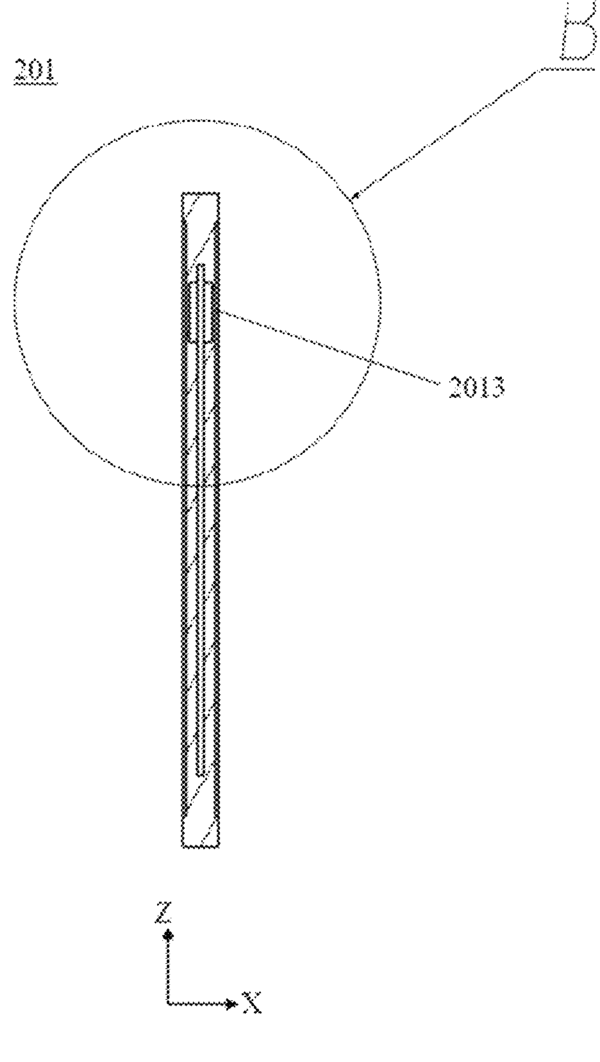
FIG. 37 is a cross-sectional view of a cooling unit sectioned along an A-A line shown in FIG. 34 according to another alternative embodiment of this application.
Figure 38:
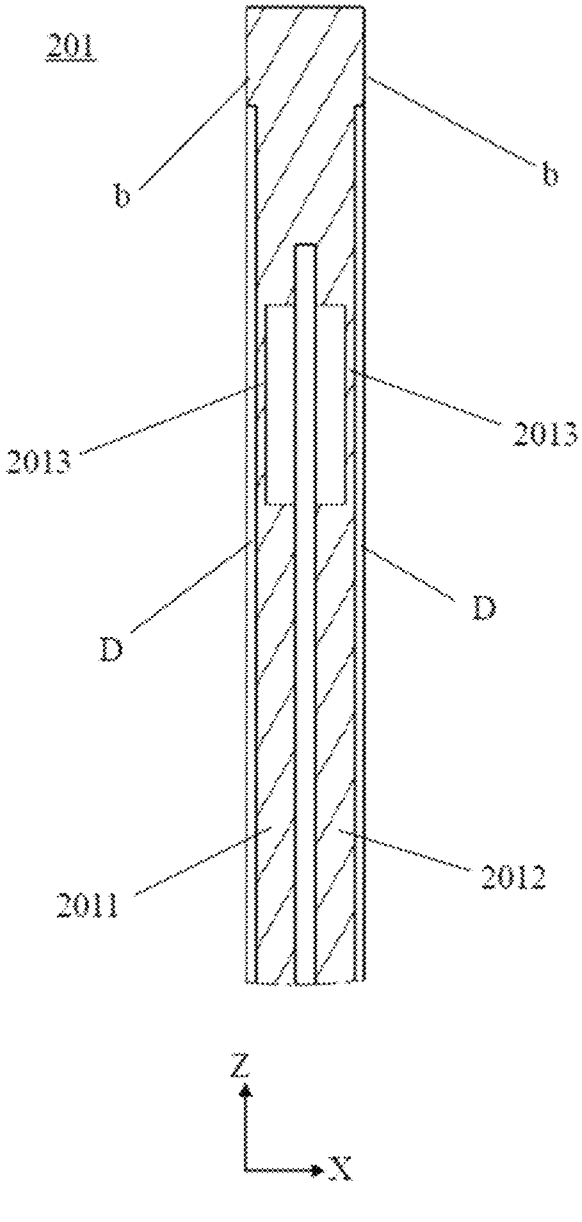
FIG. 38 is a close-up view of a circled part B shown in FIG. 37.
Figure 39:
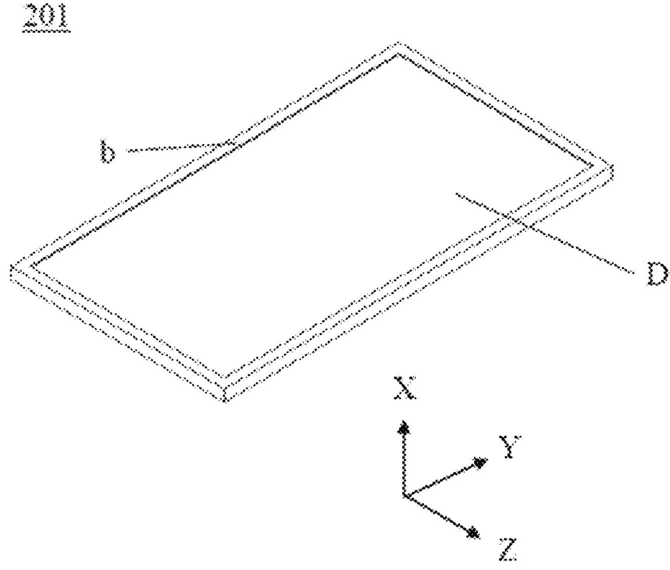
FIG. 39 is a three-dimensional structural diagram of a cooling unit according to still another alternative embodiment of this application.
Figure 40:
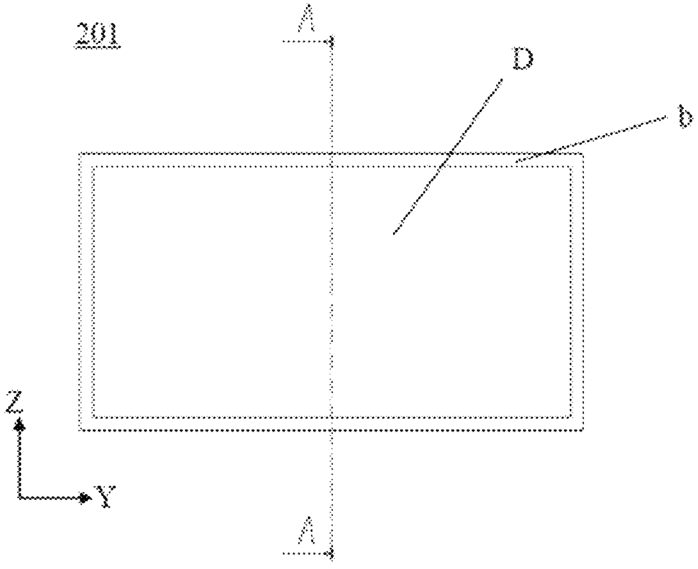
FIG. 40 is a front view of a cooling unit viewed from a first direction (X direction) according to still another alternative embodiment of this application.
Figure 41:
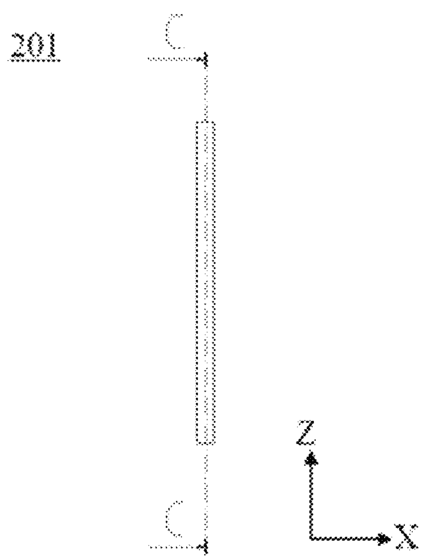
FIG. 41 is a side view of a cooling unit viewed from a second direction (Y direction) according to still another alternative embodiment of this application.

In some embodiments of this application, as shown in FIG. 15, FIG. 21, and FIG. 27, in a plan view viewed from the first direction X, the linear wall-face flow channel T forms a grid pattern or a radial pattern centered on the fragile portion 2013.

The linear wall-face flow channel T is designed in a grid pattern or a radial pattern centered on the fragile portion 2013, thereby further facilitating the flow of the cooling medium gushing out from the ruptured fragile portion 2013, and enabling the released cooling medium to spread to the surface of the battery cell 100 more quickly.

Understandably, FIG. 15 to FIG. 20 show an example in which the linear wall-face flow channel T assumes a grid pattern and the number of fragile portions 2013 is one; FIG. 21 to FIG. 26 show an example in which the linear wall-face flow channel T assumes a grid pattern and the number of fragile portions 2013 is plural (4 as shown in the drawing); and FIG. 27 to FIG. 32 show an example in which the linear wall-face flow channel T assumes a radial pattern centered on the fragile portion 2013 and the number of fragile portions 2013 is one. However, the examples shown in the drawings are merely illustrative, and this application is not limited to the examples. The pattern of the linear wall-face flow channel T and the number of fragile portions 2013 may be designed and changed as required.

As a specific example, the width of the linear wall-face flow channel is preferably 0.5 mm to 5 mm, and more preferably 2 mm. However, the numerical value is merely an example, and this application is not limited to the examples.

In some embodiments of this application, as shown in FIG. 33 to FIG. 44, a wall-face recess D recessed from an outer wall face b is created on the outer wall face b of the first cooling wall 2011 and the outer wall face of the second cooling wall 2012. The wall-face recess D provides an expansion space for the battery cell 100. In the second direction Y, the distance between an edge of the wall-face recess D and an edge of a closest outer wall face b is 3% to 20% of the length of the outer wall face 2011 in the second direction Y and is greater than 2 mm; in the third direction Z, the distance between the edge of the wall-face recess D and the edge of the closest outer wall face b is 3% to 20% of the length of the outer wall face b in the third direction Z and is greater than 2 mm; or, the area of the wall-face recess D accounts for 60% to 90% of the entire outer wall face b, and the depth of the wall-face recess D (the distance in the first direction X) is 10% to 90% of the wall thickness. The fragile portion 2013 is disposed on the wall-face recess D.

Here, by creating the wall-face recess D on the outer wall face b of the first cooling wall 2011 and the outer wall face of the second cooling wall 2012, the flow of the cooling medium is further facilitated, and the released cooling medium can be spread to the surface of the battery unit 100 more rapidly.

In addition, in a process of using the battery, the battery cell 100 inevitably expands and deforms, thereby increasing the overall size of the battery 10, and squeezing and deforming the box that contains the battery cell 100. Even worse, the squeezing between the battery cell 100 and the box may cause damage to the battery cell 100 to affect the assembling of the battery 10 and impair the lifespan of the battery. Here, the recessed wall-face recess D is created on the outer wall face b of the first cooling wall 2011 and the outer wall face of the second cooling wall 2012, so that the wall-face recess D provides an expansion space for the battery cell 100.

In addition, as mentioned in the preceding embodiment, by just disposing the fragile portion 2013 on the first cooling wall 2011 and the second cooling wall 2012, the fragile portion 2013 is caused to rupture to release the cooling medium when the battery is abnormal. However, because the cooling unit 201 is placed between two adjacent battery cells 100, the fragile portion 2013 is sometimes clogged up due to close contact between the first side face 101 of the battery cell 100 and a part of the cooling unit 201, the part on which the fragile portion 2013 is disposed. In this case, when the battery 10 is abnormal, even if the fragile portion 2013 is ruptured, the ruptured fragile portion 2013 is unable to smoothly release the cooling medium due to the clogging of the first side face 101 of the battery cell 100. Here, by disposing the recessed wall-face recess D on the outer wall face b of the first cooling wall 2011 and the outer wall face of the second cooling wall 2012 and disposing the fragile portion 2013 at the wall-face recess D, when the cooling unit 201 is placed between two adjacent battery cells 100, the first side face 101 of the battery cell 100 does not directly fit the wall-face recess D of the cooling unit 201, where the fragile portion 2013 is disposed at the wall-face recess D. In other words, the first side face 101 of the battery cell 100 is spaced apart from the fragile portion 2013 in the first direction X, thereby preventing the following circumstance in a case of abnormality of the battery 10: the cooling medium is unable to be smoothly released because the first side face 101 of the battery cell 100 clogs the ruptured fragile portion 2013. Therefore, such a design facilitates the release of the cooling medium, thereby spreading the cooling medium to the surface of the battery cell 100 more smoothly.

In some embodiments of this application, as shown in FIG. 8, FIG. 11, FIG. 20, FIG. 32, FIG. 38, and the like, the number of fragile portion 2013 is one. The fragile portion 2013 is located close to the top face 103 of the battery cell 100 in the third direction Z.

With the fragile portion 2013 being located close to the top face 103 of the battery cell 100 in the third direction Z, the fragile portion 2013 is closer to the top, thereby being more conducive to the flow of the cooling medium. When the battery 10 is abnormal and the fragile portion 2013 is ruptured, the cooling medium released from the ruptured fragile portion 2013 can be rapidly spread to the surface of the battery cell 100 by the action of gravity.

In addition, in some embodiments of this application, when there is only one fragile portion 2013, the fragile portion 2013 is preferably at equal distances from the edges on two sides of the closest outer wall face 2011 in the second direction Y (that is, located at a ½ (middle) point of the outer wall face 2011 in the second direction Y), and, in the third direction Z, the distance between the fragile portion and the edge, close to the top face 103, of the outer wall face 2011 is at least ¼ of the length of the outer wall face 2011 in the third direction Z (as shown in FIG. 8, FIG. 18, FIG. 30, FIG. 36, and the like), so as to more firmly ensure that the cooling medium flowing out from the ruptured fragile portion 2013 can quickly flow through a major area of the surface (the first side face 101) of the battery cell (a majority of the area of the major surface of the battery cell) under the action of gravity.

Figure 24:
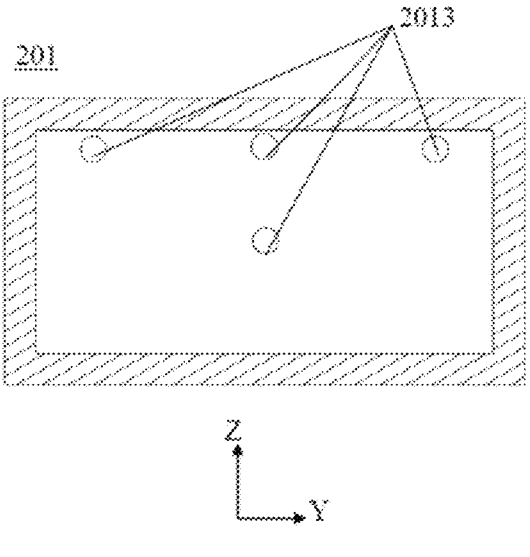
FIG. 24 is a cross-sectional view of a cooling unit sectioned along a C-C line shown in FIG. 23 according to another embodiment of this application.
Figure 25:
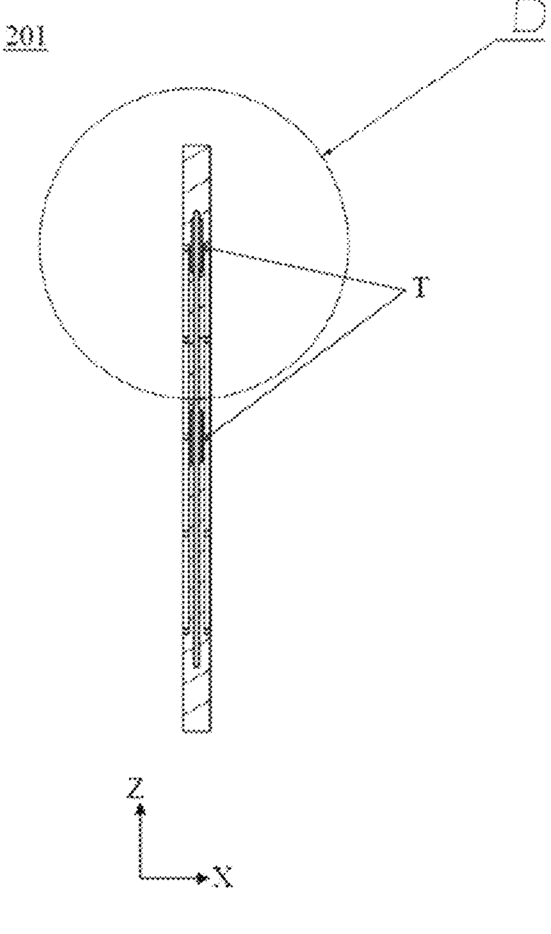
FIG. 25 is a cross-sectional view of a cooling unit sectioned along an A-A line shown in FIG. 22 according to another embodiment of this application.
Figure 26:
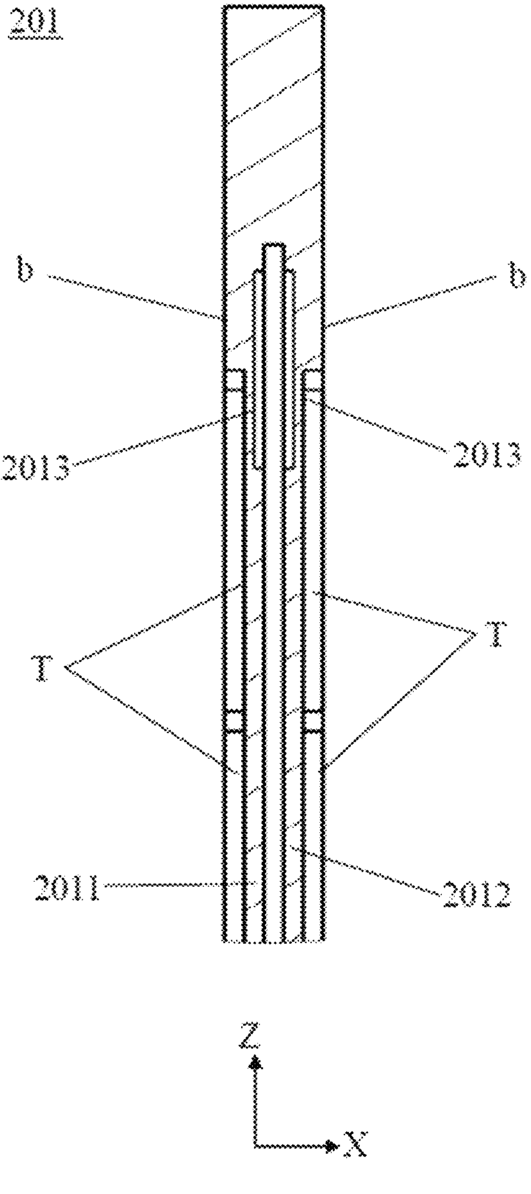
FIG. 26 is a close-up view of a circled part B shown in FIG. 25.
Figure 42:
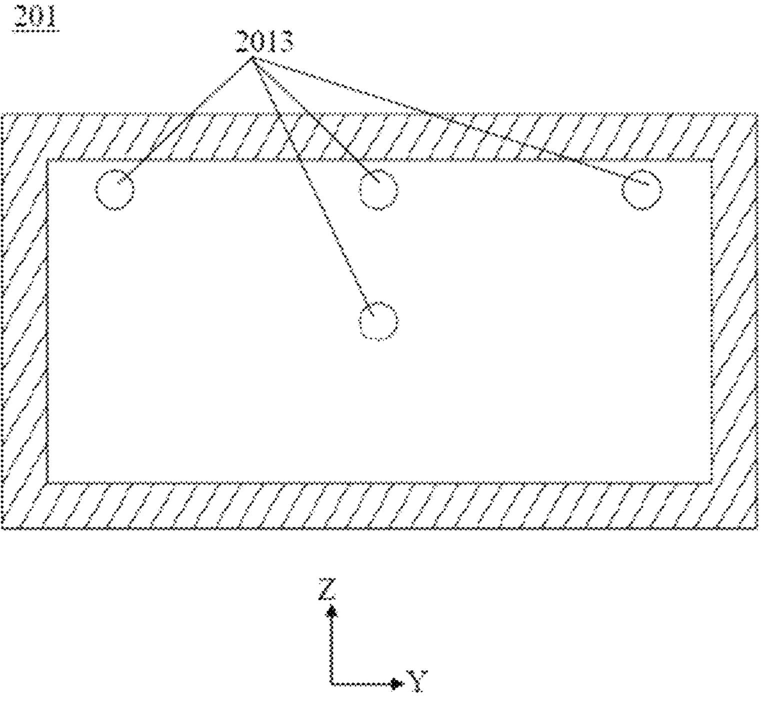
FIG. 42 is a cross-sectional view of a cooling unit sectioned along a C-C line shown in FIG. 41 according to still another alternative embodiment of this application.
Figure 43:
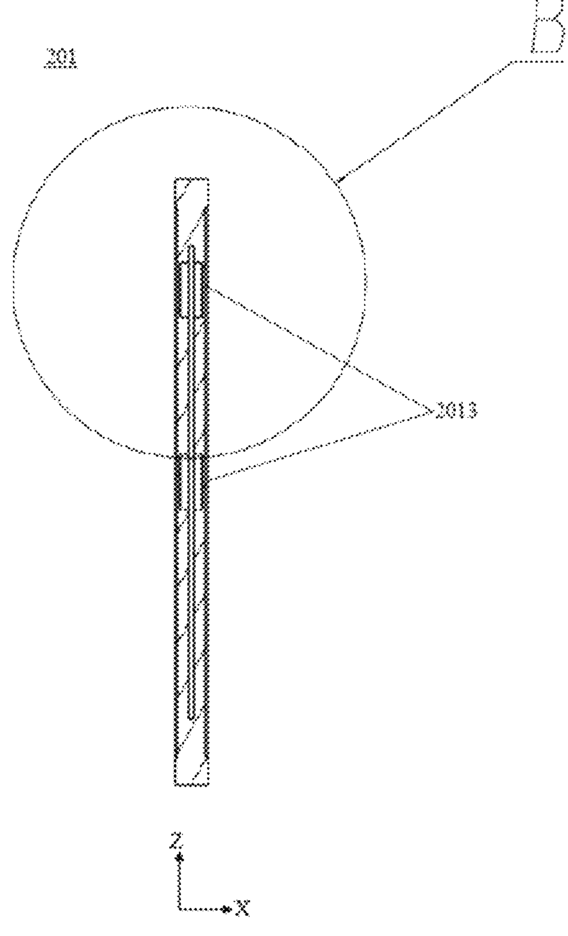
FIG. 43 is a cross-sectional view of a cooling unit sectioned along an A-A line shown in FIG. 40 according to still another alternative embodiment of this application.
Figure 44:
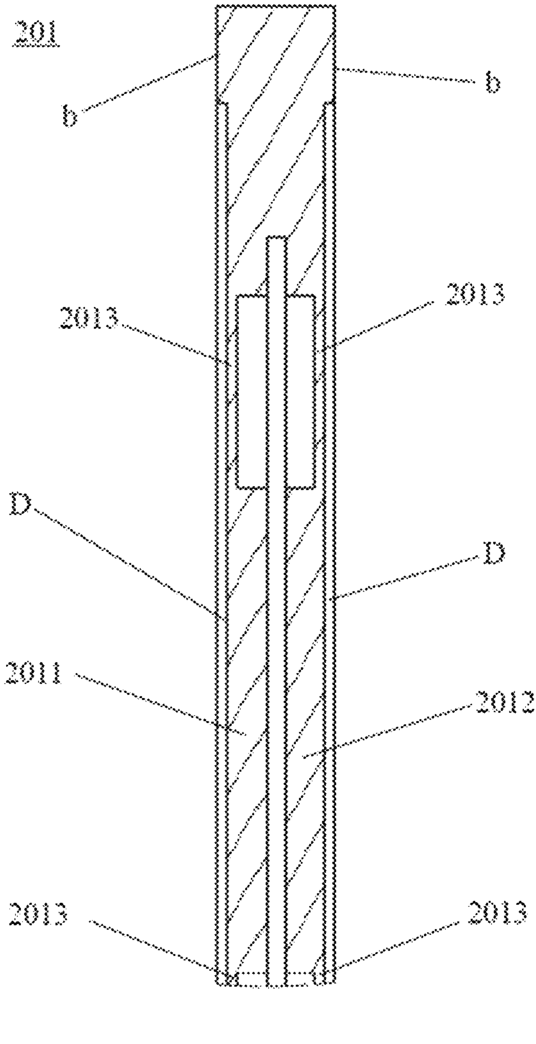
FIG. 44 is a close-up view of a circled part B shown in FIG. 43.

In some embodiments of this application, as shown in FIG. 24, FIG. 42, and the like, the number of fragile portions 2013 is plural. The plurality of fragile portions 2013 are so configured that the number of fragile portions 2013 close to the top face 103 of the battery cell 100 in the third direction Z is larger than the number of fragile portions 2013 located in other positions.

As a specific example, as shown in FIG. 24, 4 fragile portions 2013 are disposed on the first cooling wall 2011 and the second cooling wall 2012 of the cooling unit 201 separately. Among such fragile portions, 3 fragile portions 2013 are located close to the top face 103 of the battery cell 100 in the third direction Z and spaced apart at equal intervals, for example, are located at a ¼ point, a 2/4 point, and a ¾ point, respectively, in the length direction (the second direction Y) of the battery cell 100; and 1 fragile portion 2013 is located below the 3 fragile portions 2013 in the height direction (third direction Z). Moreover, preferably, this 1 fragile portion 2013 located below is positioned at the center of the first cooling wall 2011 (the second cooling wall 2012) in a plan view viewed from the first direction X.

By disposing the plurality of fragile portions 2013, the cooling medium that gushes out can cover the major surface of the battery cell more quickly, thereby ensuring faster cooling of the battery. In addition, a plurality of fragile portions 2013 are disposed, and the number of fragile portions 2013 located close to the top face 103 of the battery cell 100 in the third direction Z is made to be larger than the number of fragile portions located in other positions, thereby being more conducive to the flow of the cooling medium, and causing the released cooling medium to rapidly spread to the surface of the battery cell. In addition, considering the ease or difficulty of heat dissipation, the fragile portion is preferably disposed at a position closer to the top face 103 of the battery cell 100 in the third direction Z. Less preferably, the fragile portion is disposed at a position from which the heat of the battery can be dissipated most difficultly (at the center of the major surface of the battery). Still less preferably, the fragile portion is disposed at a position through which the cooling medium is unable to flow quickly (for example, a corner of the battery cell).

Understandably, the specific structure shown in the drawings is merely a specific example enumerated for ease of description. The number of fragile portions 2013 and the positional relationship of each fragile portion 2013 are not limited to those shown in the drawings. Various design changes may be made to the number of fragile portions 2013 and the positional relationship of each fragile portion 2013 as actually required.

Figure 18:
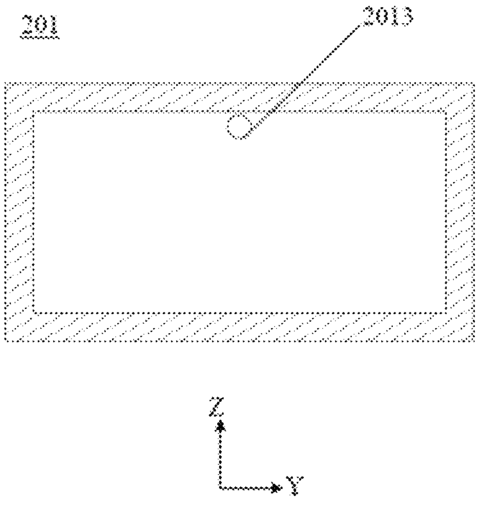
FIG. 18 is a cross-sectional view of a cooling unit sectioned along a C-C line shown in FIG. 17 according to still another embodiment of this application.
Figure 19:
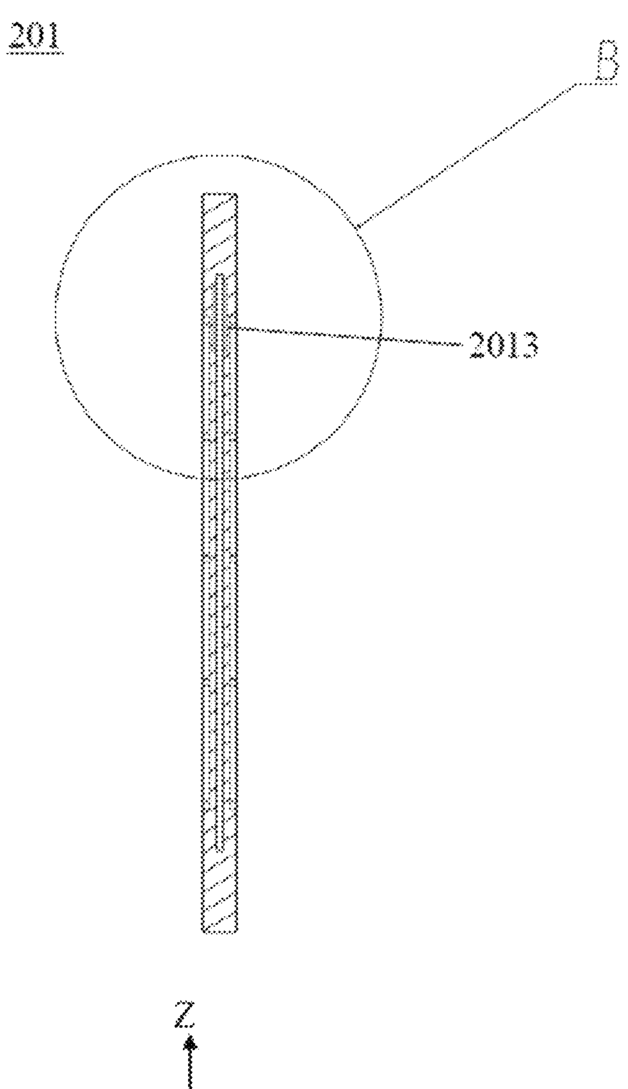
FIG. 19 is a cross-sectional view of a cooling unit sectioned along an A-A line shown in FIG. 16 according to still another embodiment of this application.
Figure 20:
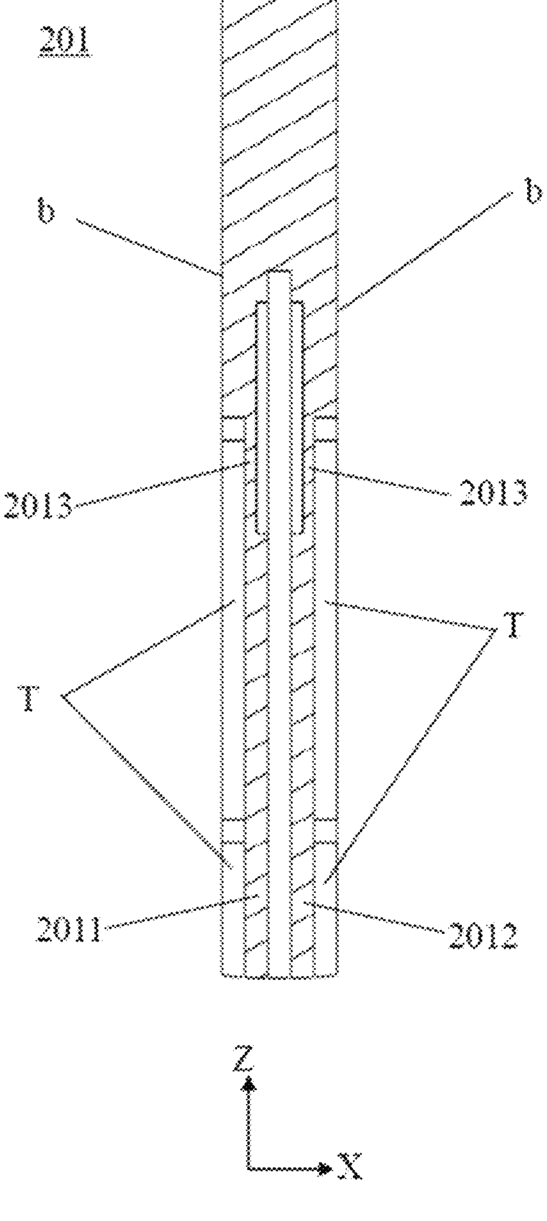
FIG. 20 is a close-up view of a circled part B shown in FIG. 19.

In some embodiments of this application, the shape of the fragile portion 2013 is circular (as shown in FIG. 18), triangular, or rectangular.

Such shapes of the fragile portion 2013 are more conducive to the flow of the cooling medium. When the battery 10 is abnormal and the fragile portion 2013 is ruptured, the cooling medium released from the ruptured fragile portion 2013 can be rapidly spread to the surface of the battery cell 100.

Understandably, the specific shape of the fragile portions 2013 shown in the drawings is merely a specific example enumerated for ease of description. The shape of fragile portions 2013 is not limited to that shown in the drawings, but various design changes may be made to the shape of fragile portions 2013 as actually required.

In some embodiments of this application, the number of the cooling units 201 is plural, and the plurality of cooling units are arranged between any two adjacent battery cells 100 respectively.

As mentioned above, the battery 10 typically includes a plurality of battery cells 100. The plurality of battery cells 100 are arranged along the first direction X (the thickness direction of the battery 10). Here, by disposing a plurality of cooling units 201 based on the number of battery cells 100, the cooling unit 201 is disposed between any two adjacent battery cells 100, thereby dissipating heat of the battery more efficiently. In this case, when the battery 10 is abnormal, the cooling unit 201 can respond to the abnormality any surface of any battery cell 100 of the battery 10, thereby dissipating heat of the battery 10 more efficiently.

Figure 45:
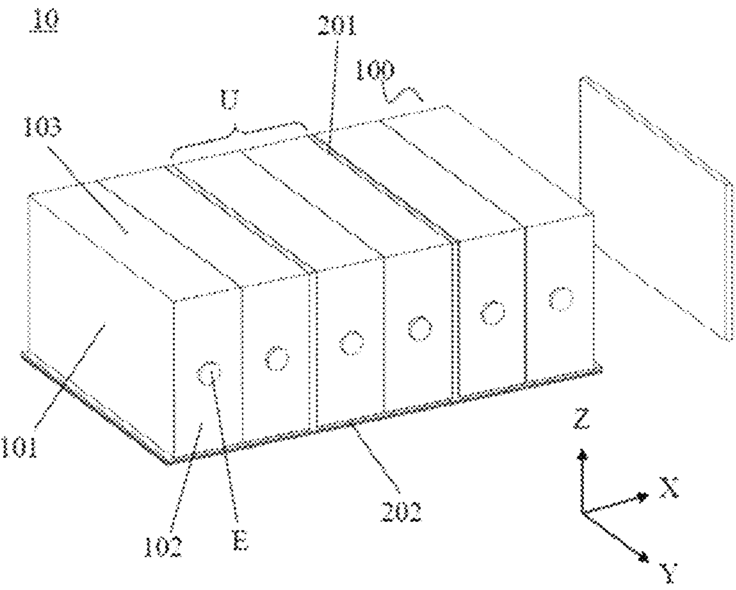
FIG. 45 is a three-dimensional diagram of a basic structure of a battery according to a different embodiment of this application.
Figure 46:
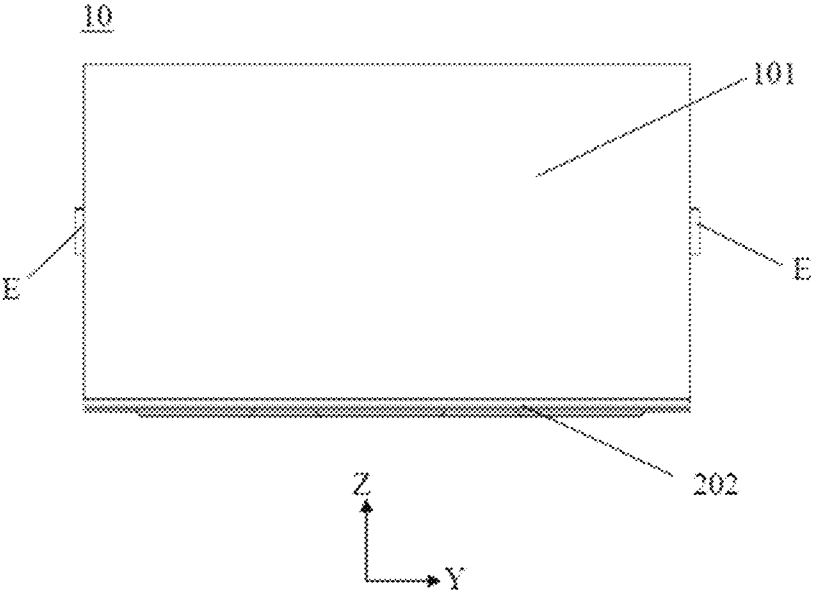
FIG. 46 is a front view of a battery viewed from a first direction (X direction) according to a different embodiment of this application.

In some embodiments of this application, as shown in FIG. 2, FIG. 45, and the like, the plurality of battery cells 100 are grouped into a plurality of battery units U, and each battery unit includes the same number of battery cells 100. The number of the cooling units 201 is plural, and the plurality of cooling units are arranged between any two adjacent battery units U respectively.

Figure 6:
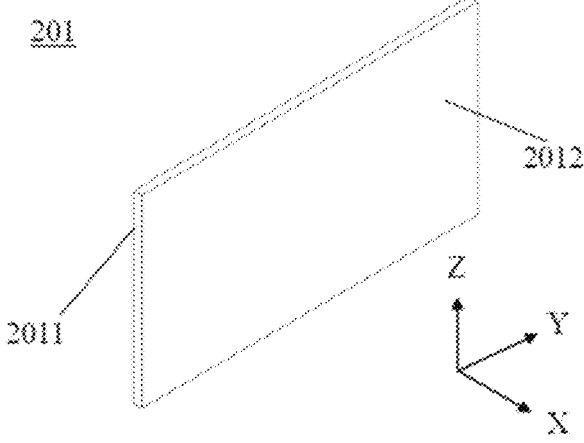
FIG. 6 is a three-dimensional structural diagram of a cooling unit according to an embodiment of this application.
Figure 7:
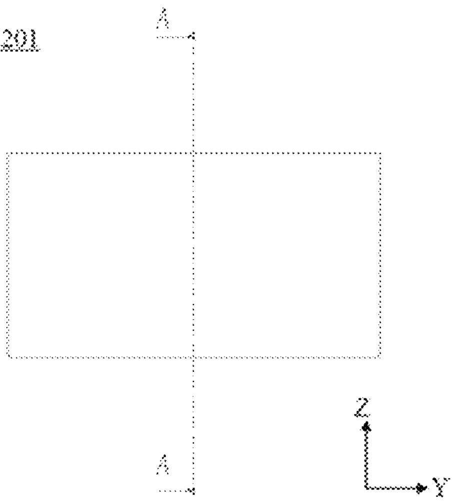
FIG. 7 is a front view of a cooling unit viewed from a first direction (X direction) according to an embodiment of this application.
Figure 8:
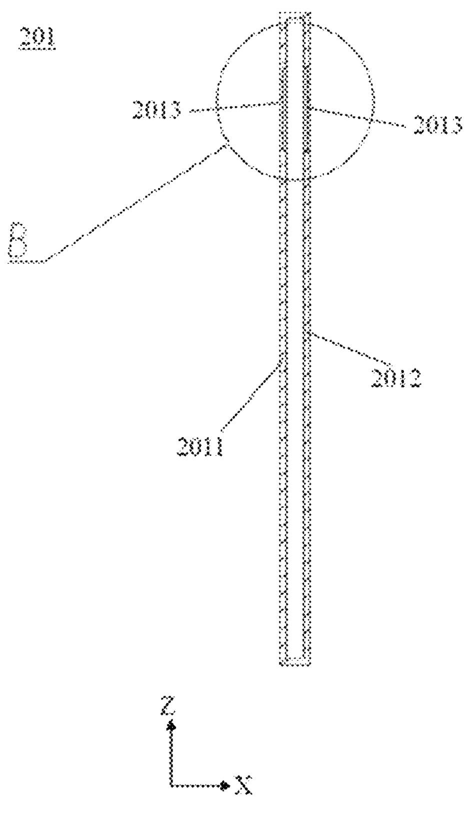
FIG. 8 is a cross-sectional view of a cooling unit sectioned along an A-A line shown in FIG. 7 according to an embodiment of this application.

As a specific example, referring to FIG. 2 and FIG. 45, 6 battery cells 100 are grouped into 3 battery units U (each including 2 battery cells 100), and each battery unit U includes 2 battery cells 100. The cooling units 201 are arranged between any two adjacent battery units U respectively.

In practical applications, the cooling unit 201 is not necessarily disposed between every two battery cells 100 due to the difference in the use environment and energy density of the battery. In addition, considering the cost-efficiency, assembling efficiency, and the fast-charging and heat insulation requirements, a plurality of battery cells 100 are grouped into a plurality of battery units U, each containing the same number of battery cells 100. In addition, a cooling unit 201 is disposed between any two adjacent battery units U separately. In this way, the cooling unit 201 can be disposed between the battery units U based on actual conditions, each battery unit containing a plurality of battery cells 100, thereby improving the assembling efficiency and reducing the manufacturing cost.

Understandably, the number of battery units U and the number of battery cells 100 in the battery unit U shown in the drawings are merely specific examples enumerated for ease of description. The number of battery units U and the number of battery cells 100 in each battery unit U are not limited to those shown in the drawings. Various design changes may be made to the number of battery units U and the number of battery cells 100 in each battery unit U as actually required.

In some embodiments of this application, as shown in FIG. 2, FIG. 45, and the like, the two electrode terminals E are disposed on the top face 103 of the battery cell 100 or disposed on the two second side faces 102 of the battery cell 100 respectively. The number of the integrated unit 202 is 1. The integrated unit is disposed on the bottom face 104 of the plurality of battery cells 100 across the plurality of battery cells 100 along the first direction X, and communicates with the cooling units 201.

Considering the overall size and the grouping manner of the battery, the integrated unit 202 of the cooling component 200 may be disposed at the bottom of the battery 10. In a specific example, as shown in FIG. 2, both electrode terminals E are disposed on the top face 103 of the battery cell 100. The battery 10 can be cooled more efficiently by disposing the cooling unit 201 between the battery cells 100 and disposing the integrated unit 202 at the bottom of the battery 10. In another specific example, as shown in FIG. 45, the two electrode terminals E are disposed on the two second side faces 102 of the battery cell 100 respectively. The battery 10 can be cooled more efficiently by disposing the cooling unit 201 between the battery cells 100 and disposing the integrated unit 202 at the bottom of the battery 10. Understandably, this application is not limited to the examples given above. In alternative implementation, the integrated unit 202 may be disposed on any surface of the battery 10 other than the surface containing an electrode post.

Figure 47:
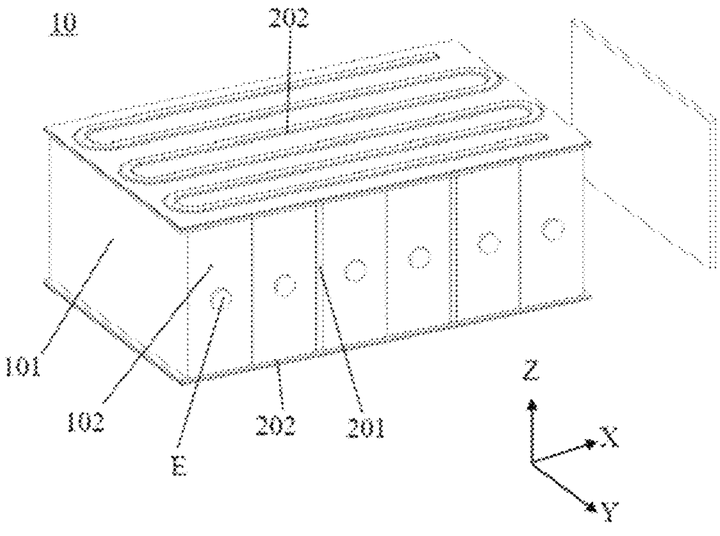
FIG. 47 is a three-dimensional diagram of a basic structure of a battery according to a different embodiment of this application.
Figure 48:
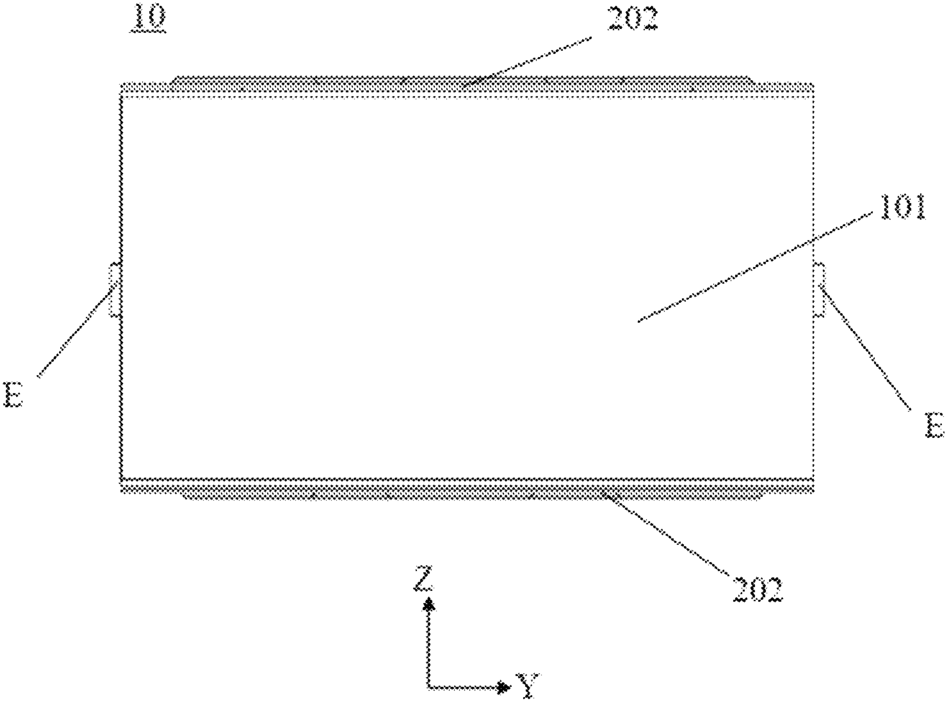
FIG. 48 is a front view of a battery viewed from a first direction (X direction) according to a different embodiment of this application.

In some embodiments of this application, as shown in FIG. 47, the two electrode terminals E are disposed on the two second side faces 102 of the battery cell 100 respectively. The number of the integrated units 202 is 2. The two integrated units are disposed on the top face 103 and the bottom face 104 of the plurality of battery cells 100, respectively, across the plurality of battery cells 100 along the first direction X, and communicate with the cooling unit 201 separately.

In actual use, depending on the use environment and energy density of the battery, the location of the electrode terminals of the battery varies. For a circumstance in which the electrode terminals E are disposed on two sides (the second side faces 102) of the battery cell 100 respectively, another integrated unit 202 may be further disposed on the top of the battery 10 (the top face 103 of the battery cell 100) in addition to 1 integrated unit 202 disposed at the bottom (the bottom face 104 of the battery cell 100) of the battery 10 and the cooling unit 201 disposed between the battery cells 100, thereby implementing more efficient cooling for the battery 10 from both the top and the bottom through the two integrated units 202.

In some embodiments of this application, a heat transfer layer may be further disposed between the cooling unit 201 and the battery cell 100.

To improve the heat dissipation effect of the cooling component, a heat transfer layer is further disposed between the cooling unit 201 and the battery cell 100 to dissipate heat of the battery 10 more efficiently. In some embodiments, the heat transfer layer may be formed of a thermal adhesive or heat transfer pad of excellent heat transfer performance. However, this application is not limited to such materials. The specific material of the heat transfer layer may be designed and changed as actually required.

In addition, an embodiment of this application further provides an device. The device includes the battery 10 according to any one of the foregoing embodiments. The battery 10 is configured to provide electrical energy for the device. Optionally, the device may be a vehicle, watercraft, spacecraft, or the like.

Figure 49:
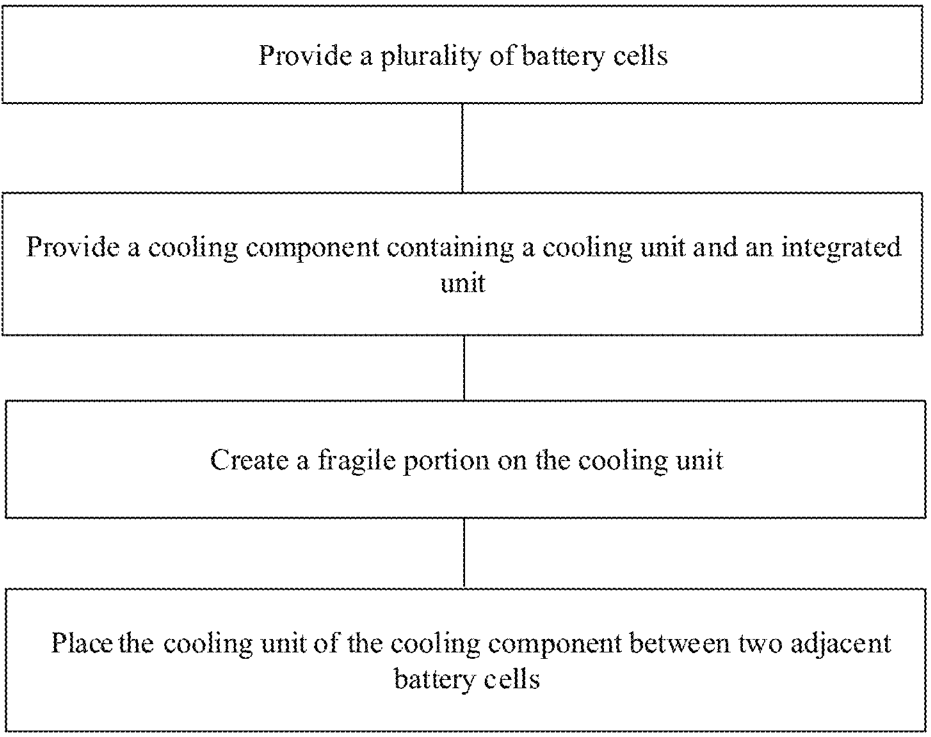
FIG. 49 is a schematic diagram of a method for manufacturing a battery according to an embodiment of this application.

The following describes a method for manufacturing the battery according to an embodiment of this application with reference to FIG. 49. For the content that is not described in this embodiment in detail, reference may be made to the preceding embodiments.

FIG. 1 is a schematic block diagram of a method for manufacturing a battery 10 according to an embodiment of this application. The method for manufacturing a battery according to this embodiment of this application includes the following steps S1 to S4:

- S1: Providing a plurality of battery cells, where the plurality of battery cells are arranged along a first direction; each of the battery cells includes two first side faces disposed opposite to each other in the first direction, two second side faces disposed opposite to each other in a second direction, a top face and a bottom face disposed opposite to each other in a third direction, and two electrode terminals; the first direction, the second direction, and the third direction are orthogonal to each other; and the first side faces are larger than the second side faces in area;
- S2: Providing a cooling component, where the cooling component contains a cooling medium to cool the battery cells, the cooling component includes a cooling unit and an integrated unit; the cooling unit is in a plate shape formed by a first cooling wall and a second cooling wall that are opposite to each other in the first direction; and a channel available for flow of the cooling medium is formed between the first cooling wall and the second cooling wall;
- S3: Creating a fragile portion, and creating the fragile portion on the first cooling wall and the second cooling wall separately, so that, when the battery is abnormal, the fragile portion is able to rupture to release the cooling medium; and
- S4: Placing the cooling unit between two adjacent battery cells.

Understandably, the method for manufacturing a battery according to this application is not limited to the order from step S1 to step S2, step S3, and step S4 described above. In alternative example, the order may be from step S2 to step S1, step S3, and step S4, or from step S2 to step S3, step S1, and step S4, or the like.

Finally, it is hereby noted that this application is not limited to the foregoing embodiments. The foregoing embodiments are merely for illustrative purposes. Any and all embodiments with substantively the same composition or exerting the same effects as the technical ideas hereof without departing from the scope of the technical solutions of this application still fall within the technical scope of this application. In addition, all kinds of variations of the embodiments conceivable by a person skilled in the art and any other embodiments derived by combining some constituents of the embodiments hereof without departing from the subject-matter of this application still fall within the scope of this application.

What is claimed is:

1. A battery, comprising:

a plurality of battery cells, wherein the plurality of battery cells are arranged along a first direction; each of the battery cells comprises two first side faces disposed opposite to each other in the first direction, two second side faces disposed opposite to each other in a second direction, a top face and a bottom face disposed opposite to each other in a third direction, and two electrode terminals; the first direction, the second direction, and the third direction are orthogonal to each other; and the first side faces are larger than the second side faces in area; and a cooling component, containing a cooling medium to cool the battery cells, wherein the cooling component comprises a cooling unit and an integrated unit; the cooling unit is in a plate shape formed by a first cooling wall and a second cooling wall that are opposite to each other in the first direction, and is disposed between two adjacent battery cells; and a channel available for flow of the cooling medium is formed between the first cooling wall and the second cooling wall, wherein the first cooling wall and the second cooling wall each comprise a fragile portion, and, when the battery is abnormal, the fragile portion is able to rupture to release the cooling medium;

the fragile portion comprises a thin-walled portion, and a wall thickness of the thin-walled portion is less than a wall thickness of a remaining part of the first cooling wall and the second cooling wall;

the first cooling wall and the second cooling wall each comprise an inner wall face and an outer wall face, and the thin-walled portion is formed by reducing the wall thickness by starting from the inner wall face of the first cooling wall and the inner wall face of the second cooling wall; and an area of the first cooling wall is the same as the area of the first side face that faces the first cooling wall and an area of the second cooling wall is the same as the area of the first side face that faces the second cooling wall.

2. The battery according to claim 1, wherein a thickness of the first cooling wall is identical to a thickness of the second cooling wall, and is 0.2 mm to 1.5 mm; and a thickness of the thin-walled portion is less than or equal to 0.2 mm.

3. The battery according to claim 1, wherein a linear wall-face flow channel recessed from an outer wall face is created on the outer wall face of the first cooling wall and the outer wall face of the second cooling wall; and in a plan view viewed from the first direction, the linear wall-face flow channel partially overlaps the fragile portion.

4. The battery according to claim 3, wherein in a plan view viewed from the first direction, the linear wall-face flow channel forms a grid pattern or a radial pattern centered on the fragile portion.

5. The battery according to claim 1, wherein a wall-face recess recessed from an outer wall face is created on the outer wall face of the first cooling wall and the outer wall face of the second cooling wall, and the wall-face recess provides an expansion space for the battery cell;

in the second direction, a distance between an edge of the wall-face recess and an edge of a closest outer wall face is 3% to 20% of a length of the outer wall face in the second direction and is greater than 2 mm; in the third direction, a distance between the edge of the wall-face recess and the edge of the closest outer wall face is 3% to 20% of a length of the outer wall face in the third direction and is greater than 2 mm; or, an area of the wall-face recess accounts for 60% to 90% of the outer wall face, and a depth of the wall-face recess is 10% to 90% of the wall thickness; and the fragile portion is disposed at the wall-face recess.

6. The battery according to claim 1, wherein a number of the fragile portion is one, and the fragile portion is located close to a top face of the battery cell in the third direction.

7. The battery according to claim 1, wherein a number of the fragile portions is plural, and a number of fragile portions located close to a top face of the battery cell in the third direction is greater than a number of fragile portions located in other positions.

8. The battery according to claim 1, wherein a shape of the fragile portion is circular, triangular, or rectangular.

9. The battery according to claim 1, wherein a number of the cooling units is plural, and the plurality of cooling units are arranged between any two adjacent battery cells respectively.

10. The battery according to claim 1, wherein the plurality of battery cells are grouped into a plurality of battery units, and each battery unit comprises a same number of battery cells; and a number of the cooling units is plural, and the plurality of cooling units are arranged between any two adjacent battery units respectively.

11. The battery according to claim 1, wherein the two electrode terminals are disposed on the top face of the battery cell or disposed on the two second side faces of the battery cell respectively; and a number of the integrated unit is 1, and the integrated unit is disposed on the bottom face of the plurality of battery cells across the plurality of battery cells along the first direction, and communicates with the cooling unit.

12. The battery according to claim 1, wherein the two electrode terminals are disposed on the two second side faces of the battery cell respectively; and a number of the integrated unit is 2, and the two integrated units are disposed on the top face and the bottom face of the plurality of battery cells respectively across the plurality of battery cells along the first direction, and communicate with the cooling unit separately.

13. The battery according to claim 1, wherein a heat transfer layer is further disposed between the cooling unit and the battery cell.

14. An electrical device, comprising the battery according to claim 1, wherein the battery is configured to provide electrical energy.

15. A method for manufacturing a battery, comprising:

providing a plurality of battery cells, wherein the plurality of battery cells are arranged along a first direction; each of the battery cells comprises two first side faces disposed opposite to each other in the first direction, two second side faces disposed opposite to each other in a second direction, a top face and a bottom face disposed opposite to each other in a third direction, and two electrode terminals; the first direction, the second direction, and the third direction are orthogonal to each other; and the first side faces are larger than the second side faces in area;

providing a cooling component, wherein the cooling component contains a cooling medium to cool the battery cells, the cooling component comprises a cooling unit and an integrated unit; the cooling unit is in a plate shape formed by a first cooling wall and a second cooling wall that are opposite to each other in the first direction; and a channel available for flow of the cooling medium is formed between the first cooling wall and the second cooling wall;

creating a fragile portion, and creating the fragile portion on the first cooling wall and the second cooling wall separately, so that, when the battery is abnormal, the fragile portion is able to rupture to release the cooling medium; and placing the cooling unit between two adjacent battery cells, wherein the fragile portion comprises a thin-walled portion, and a wall thickness of the thin-walled portion is less than a wall thickness of a remaining part of the first cooling wall and the second cooling wall;

the first cooling wall and the second cooling wall each comprise an inner wall face and an outer wall face, and the thin-walled portion is formed by reducing the wall thickness by starting from the inner wall face of the first cooling wall and the inner wall face of the second cooling wall; and an area of the first cooling wall is the same as the area of the first side face that faces the first cooling wall and an area of the second cooling wall is the same as the area of the first side face that faces the second cooling wall.

* * * * *